(12) United States Patent
Yoshida

(10) Patent No.: US 7,012,705 B1
(45) Date of Patent: Mar. 14, 2006

(54) COMMUNICATION APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/146,069

(22) Filed: Sep. 2, 1998

(30) Foreign Application Priority Data

Sep. 5, 1997 (JP) .................................. 9-257798
Dec. 5, 1997 (JP) .................................. 9-352381

(51) Int. Cl.
*H04N 1/00* (2006.01)
*H04M 11/00* (2006.01)

(52) U.S. Cl. ..................... 358/1.15; 358/402; 358/405; 358/407; 709/238; 379/88.12; 379/100.06

(58) Field of Classification Search ............... 358/1.15, 358/402, 403, 405, 407, 442, 468; 709/206, 709/223, 224, 225, 227, 229, 238, 239, 240; 379/88.11, 88.12, 88.13, 88.17, 93.24, 100.06, 379/100.09; 370/352
See application file for complete search history.

(56) References Cited

U.S. PATENT DOCUMENTS

| | | | | | |
|---|---|---|---|---|---|
| 5,293,250 | A | * | 3/1994 | Okumura et al. | ............ 358/402 |
| 5,608,786 | A | * | 3/1997 | Gordon | ....................... 370/352 |
| 5,675,507 | A | * | 10/1997 | Bobo, II | ..................... 709/206 |
| 5,712,907 | A | * | 1/1998 | Wegner et al. | ............... 379/112 |
| 5,805,298 | A | * | 9/1998 | Ho et al. | ..................... 358/402 |
| 5,850,519 | A | * | 12/1998 | Vazana | ....................... 709/206 |
| 5,875,302 | A | * | 2/1999 | Obhan | ......................... 709/225 |
| 5,905,777 | A | * | 5/1999 | Foladare et al. | .......... 379/90.01 |
| 5,944,786 | A | * | 8/1999 | Quinn | ......................... 709/206 |
| 5,956,521 | A | * | 9/1999 | Wang | .......................... 710/35 |
| 6,011,794 | A | * | 1/2000 | Mordowitz et al. | .......... 370/389 |
| 6,025,931 | A | * | 2/2000 | Bloomfield | .................. 358/402 |
| 6,052,442 | A | * | 4/2000 | Cooper et al. | ........... 379/88.19 |
| 6,192,045 | B1 | * | 2/2001 | Williams et al. | ............ 370/352 |
| 6,211,972 | B1 | * | 4/2001 | Okutomi et al. | ............ 358/402 |
| 6,233,318 | B1 | * | 5/2001 | Picard et al. | ............ 379/88.17 |
| 6,278,704 | B1 | * | 8/2001 | Creamer et al. | ............ 370/352 |
| 6,374,291 | B1 | * | 4/2002 | Ishibashi et al. | ............ 709/206 |

FOREIGN PATENT DOCUMENTS

| | | | |
|---|---|---|---|
| WO | WO 96/41463 | * | 12/1996 |
| WO | WO 97/10668 | * | 3/1997 |
| WO | WO 97/10668 A1 | * | 3/1997 |
| WO | WO-97/10688 A1 | * | 3/1997 |

* cited by examiner

*Primary Examiner*—Joseph R. Pokrzywa
(74) *Attorney, Agent, or Firm*—Morgan & Finnegan, LLP

(57) ABSTRACT

This invention is to provide a communication apparatus capable of quickly performing facsimile communication through the Internet by dial-up connection. When facsimile communication through the Internet is executed from a station A to a station B by dial-up connection, the user at the station B is notified, from the station A using a PSTN, that communication through the Internet has been executed. When it is notified using the PSTN that communication through the Internet has been executed, the apparatus at the station B sets up connection to the Internet by dial-up connection to receive facsimile communication information through the Internet by POP.

12 Claims, 23 Drawing Sheets

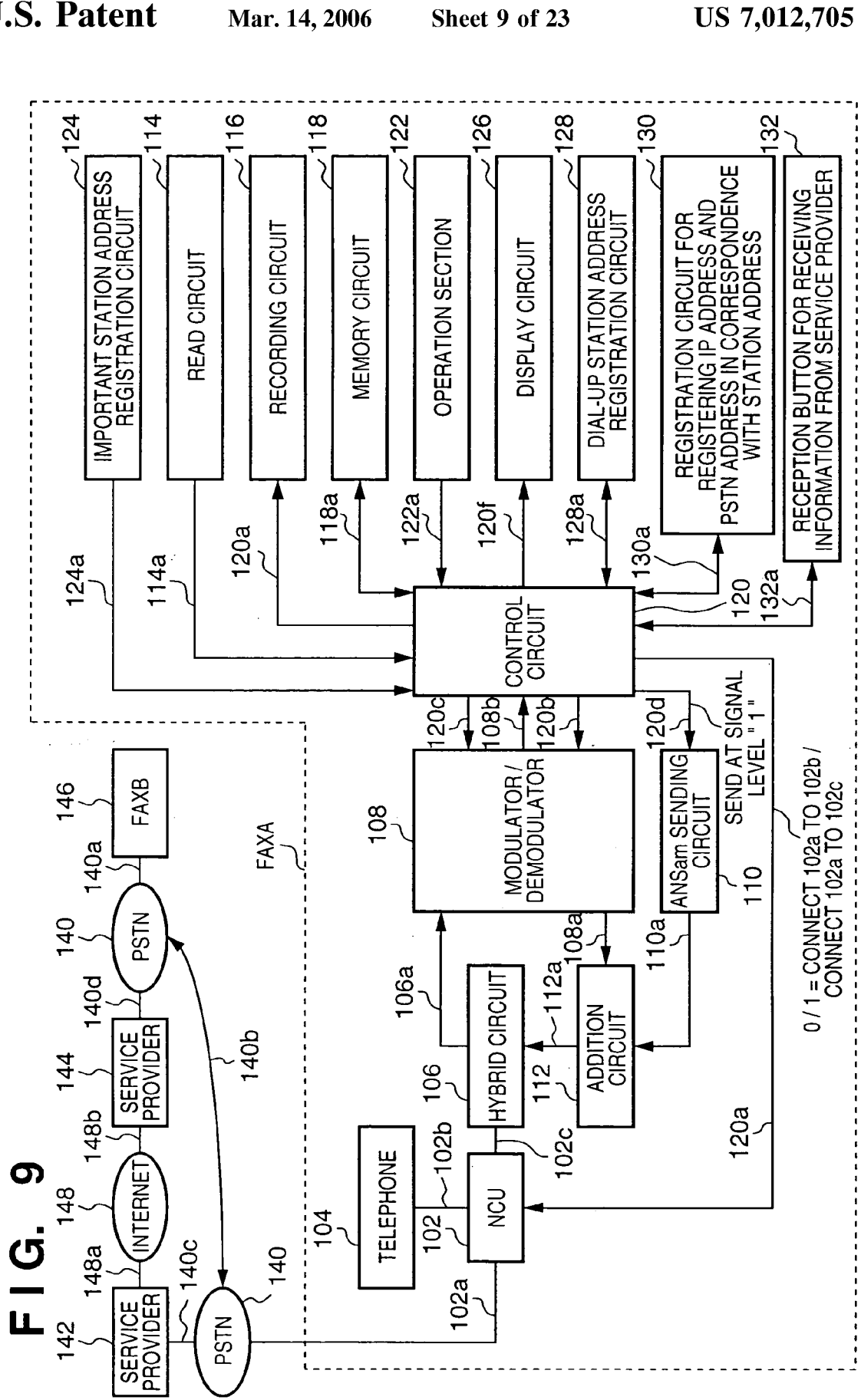

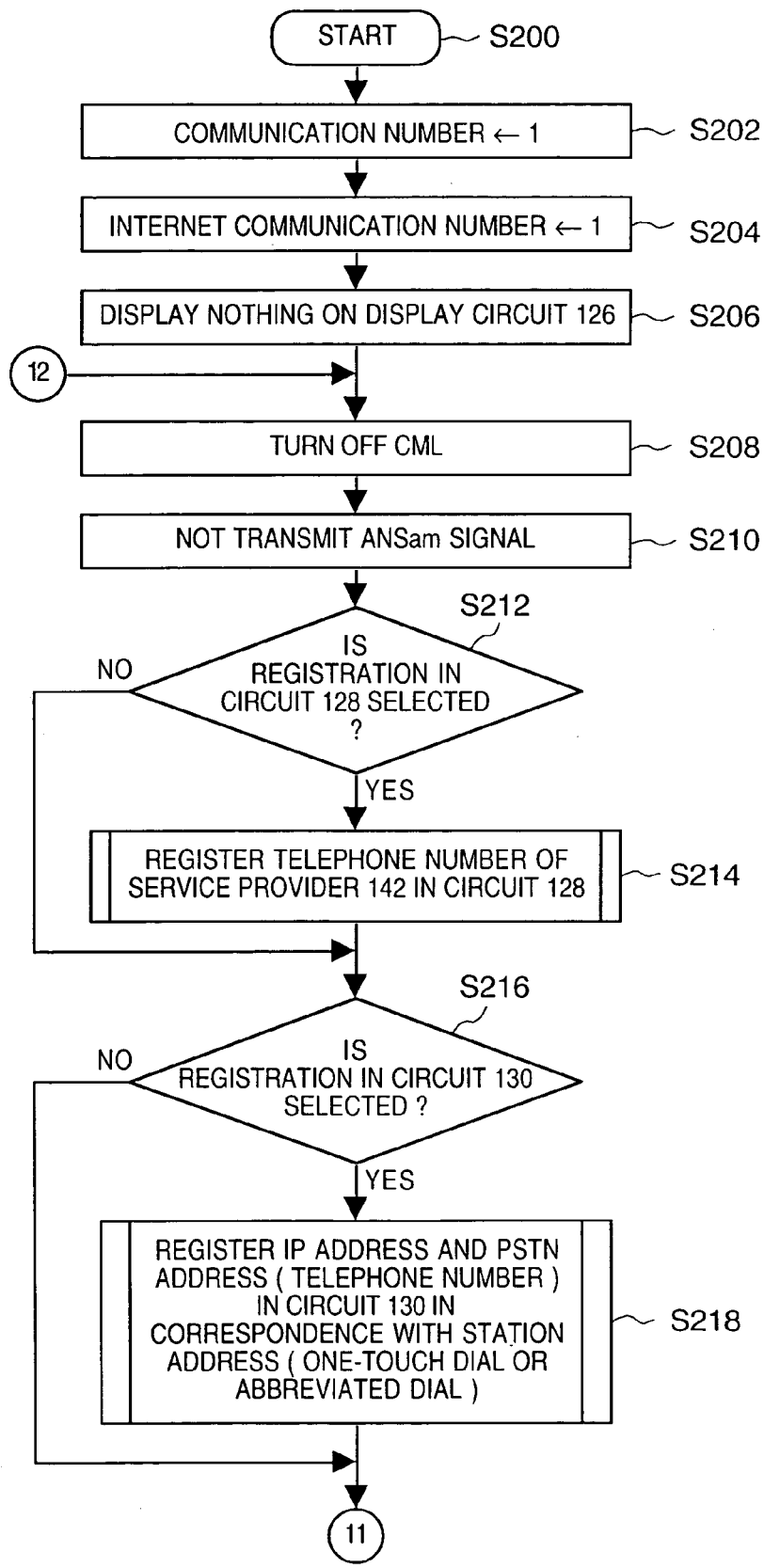

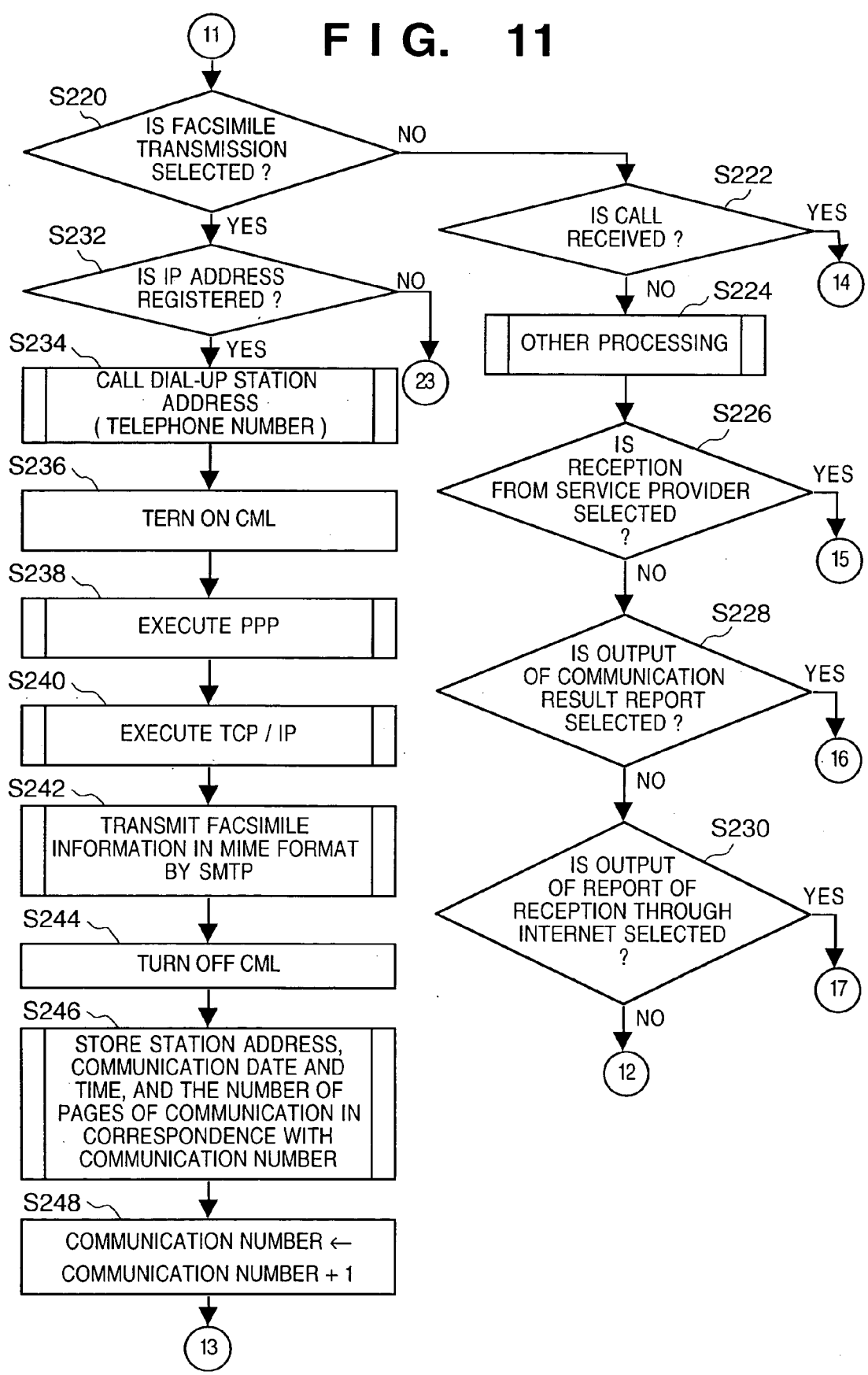

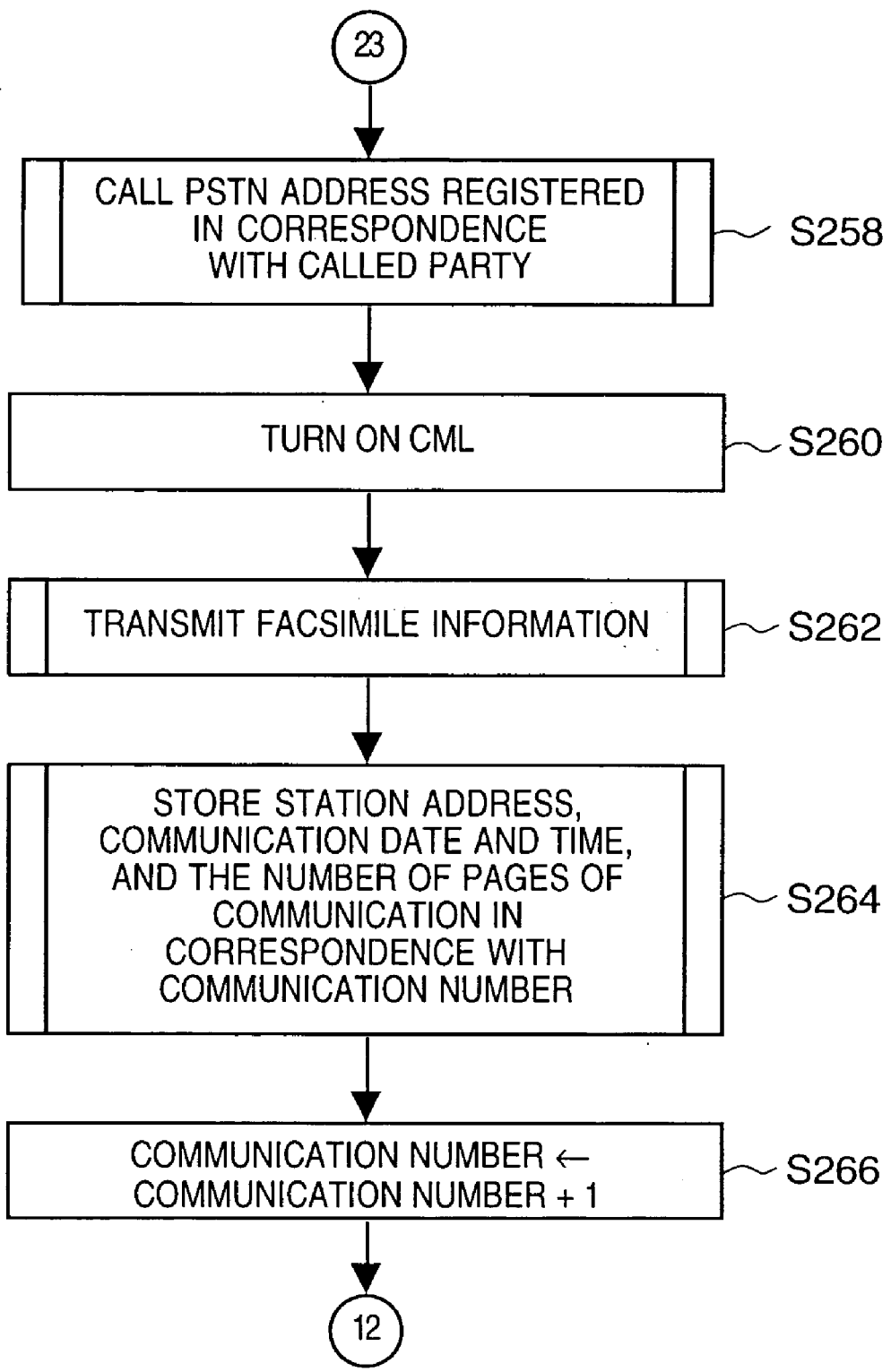

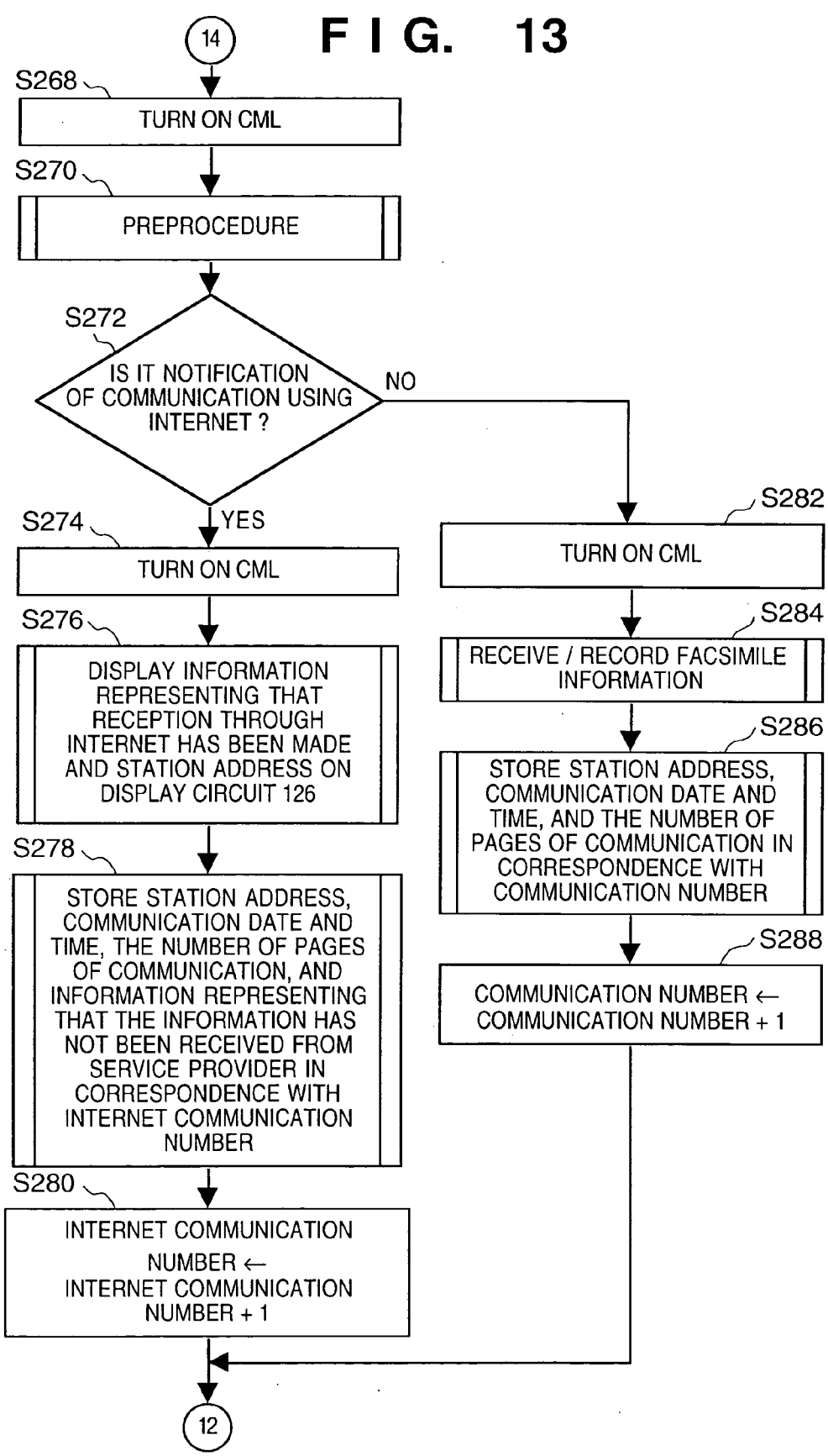

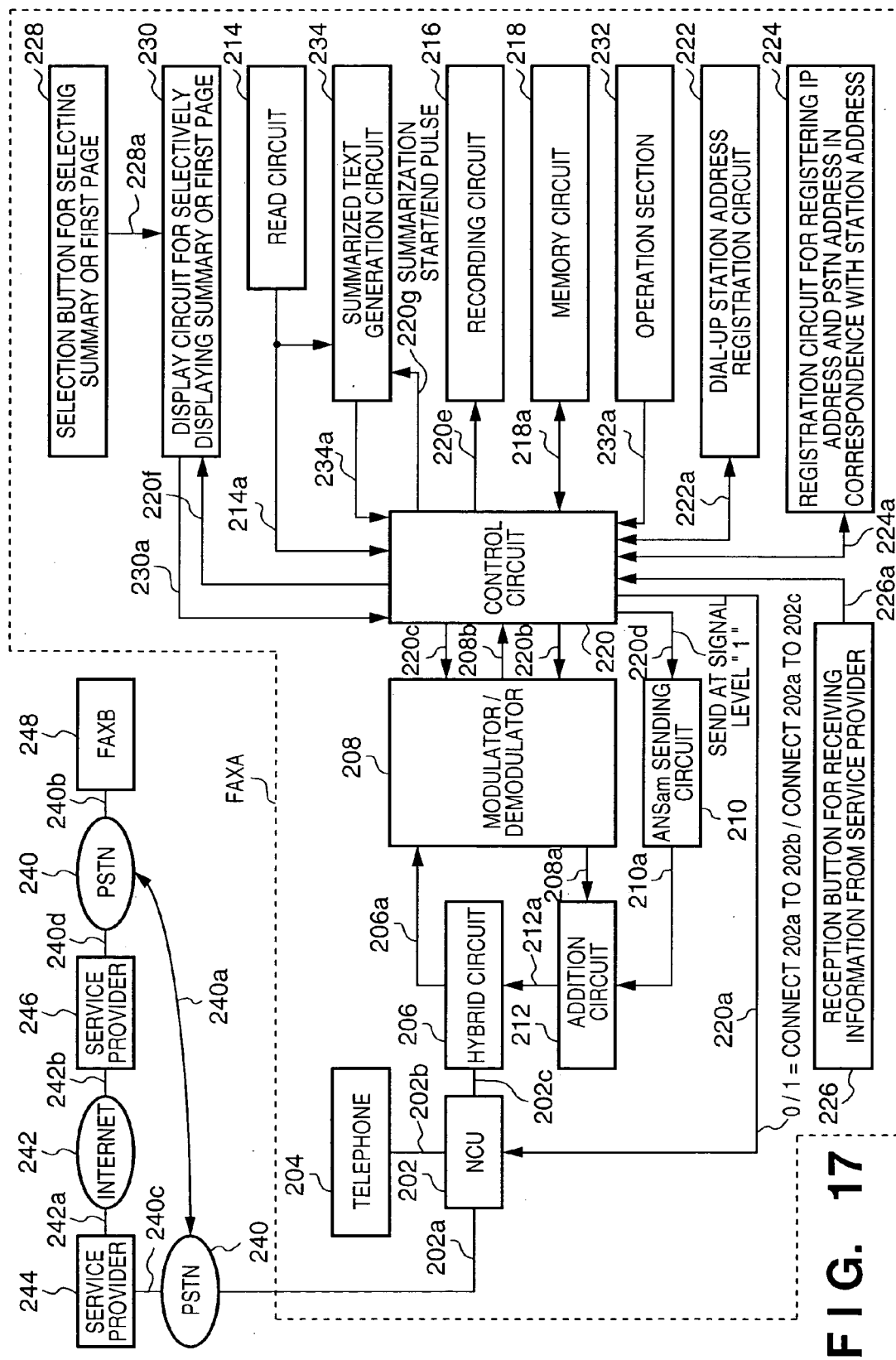
F I G. 17

COMMUNICATION APPARATUS

BACKGROUND OF THE INVENTION

1. Field of the Invention

The present invention relates to a communication apparatus for performing facsimile communication through a network such as the Internet.

2. Description of the Related Art

Various methods of facsimile communication through the Internet have been conventionally proposed. For example, to place a call, communication through the Internet is tried a predetermined number of times, and if communication is not possible, normal communication through the PSTN is performed. Alternatively, communication through the Internet or communication through the PSTN is selected depending on the amount of information to be transmitted or the transmission mode (direct transmission or memory transmission).

Also, a method of divisionally transmitting one text by communication through the Internet and communication through the PSTN, and combining the respective data into one text on the receiving side, and a method of selecting communication through the Internet or communication through the PSTN on the basis of the communication mode have been proposed.

As a scheme of connecting a network service provider as a provider of the commercial Internet service and a user terminal, dial-up connection that establishes IP (Internet Protocol) connection through a public switching network such as a telephone network or the ISDN is available.

In facsimile communication using this dial-up connection via a service provider, reception information can be immediately transmitted to a service provider near the receiver.

However, when the receiver wants to receive the facsimile information from the service provider on the receiving side, the receiver itself must establish dial-up connection to the service provider and perform POP (Post Office Protocol) processing. For this reason, in facsimile communication through the Internet, the instantaneity of facsimile communication cannot be ensured.

If the receiver connects itself to the service provider on the receiving side by dial-up connection at a short time interval to ensure the instantaneity, the reception information can be immediately received, though this results in an increase in communication cost.

When a conventional facsimile apparatus executes facsimile communication from a station A to an Internet service provider (to be referred to as an ISP hereinafter) near a station B by dial-up connection, the user at the station B cannot detect arrival of the reception information of the facsimile communication at the ISP.

For this reason, even when facsimile communication from the station A to the station B is executed through the Internet on urgent business, the user at the station B is unaware of arrival of the reception information of the facsimile communication at the ISP, so the real-time properties of facsimile communication cannot be exploited.

SUMMARY OF THE INVENTION

It is an object of the present invention to provide a communication apparatus capable of performing, without delay, facsimile communication through the Internet by dial-up connection.

It is another object of the present invention to provide a communication apparatus capable of notifying the user on the receiving side of facsimile communication through the Internet without troubling the user on the transmitting side.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a block diagram showing the fourth and fifth embodiments of the present invention;

FIG. 10 is a flow chart showing the operation of the fourth embodiment;

FIG. 11 is a flow chart showing the operation of the fourth embodiment;

FIGS. 12A and 12B are flow charts showing the operation of the fourth embodiment;

FIG. 13 is a flow chart showing the operation of the fourth embodiment;

FIG. 17 is a block diagram showing the sixth to ninth embodiments of the present invention;

DETAILED DESCRIPTION OF THE PREFERRED EMBODIMENTS

First Embodiment

Figure 1:
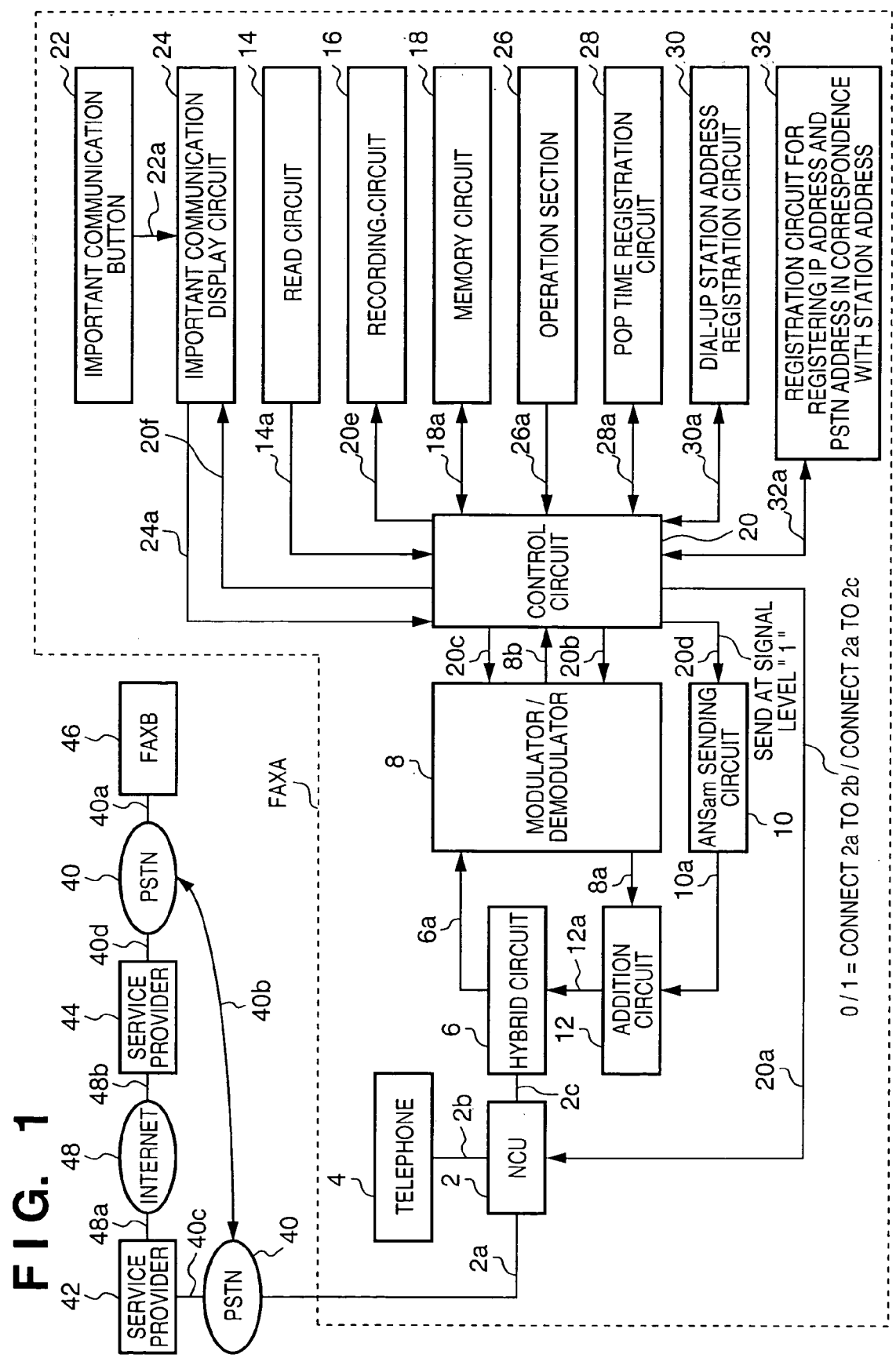
FIG. 1 is a block diagram showing the first to third embodiments of the present invention.

FIG. 1 is a block diagram showing the arrangement of a facsimile apparatus according to the first to third embodiments of the present invention.

An NCU (Network Control Unit) 2 is connected to a terminal of a line to use a telephone network for data communication or the like. The NCU 2 controls connection of a telephone switching network, switches to a data communication line, or holds a loop. When the signal level (signal line 20a) from a control circuit 20 is "0", the NCU 2 connects a telephone line 2a to the telephone 4 side. When the signal level is "1", the NCU 2 connects the telephone line 2a to the facsimile apparatus side. Normally, the telephone line 2a is connected to the telephone 4 side.

A hybrid circuit 6 separates a signal of the transmission system and a signal of the reception system from each other. A transmission signal from an addition circuit 12 is sent to the telephone line 2a via the NCU 2. A signal from the partner is received via the NCU 2 and sent to a modulator/demodulator 8 through a signal line 6a.

The modulator/demodulator 8 performs modulation and demodulation based on the ITU-T recommendations V.8, V.21, V.27ter, V.29, V.17, and V.34. The transmission mode is designated through a signal line 20c. The modulator/demodulator 8 receives a signal output to a signal line 20b and outputs modulated data to a signal line 8a, or receives a reception signal output to the signal line 6a and outputs demodulated data to a signal line 8b.

An ANSam sending circuit 10 sends an ANSam signal. When a signal of level "1" is output to a signal line 20d, the ANSam sending circuit 10 sends an ANSam signal to a signal line 10a. When a signal of level "0" is output to the signal line 20d, the ANSam sending circuit 10 sends no signal to the signal line 10a.

The addition circuit 12 receives information on the signal line 8a and information on the signal line 10a and outputs the sum to a signal line 12a. A read circuit 14 reads the original image and outputs the read image data to a signal line 14a. A recording circuit 16 sequentially records information output to a signal line 20e in units of lines.

A memory circuit 18 is used to store read data (data before coding) or coded image information, or store received image information or decoded information.

An important communication button 22 is used to select an important communication. When this button 22 is depressed, an ON pulse is generated on a signal line 22a.

An important communication display circuit 24 displays that an important communication is selected. When a clear pulse is generated on a signal line 20f, "important communication is not displayed". After this, every time an ON pulse is generated on the signal line 22a, the mode is repeatedly switched: "important communication is displayed"→"important communication is not displayed"→"important communication is displayed". For the mode "important communication is displayed", the important communication display circuit 24 outputs a signal of level "1" to a signal line 24a. For the mode "important communication is not displayed", the important communication display circuit 24 outputs a signal of level "0" to the signal line 24a.

An operation section 26 has one-touch dial keys, abbreviated dial keys, a ten-key pad, "*"/"#" keys, set keys, a start key, a registration key for a registration circuit 28, a registration key for a registration circuit 30, a registration key for a registration circuit 32, and other function keys. Depressed key information is output to a signal line 26a.

The time registration circuit 28 is used to register a desired access time through a signal line 28a such that the apparatus accesses the service provider at the desired time to receive information received by the service provider.

The station address registration circuit 30 is used to register the station address for dial-up connection to the service provider through a signal line 30a.

The address registration circuit 32 is used to register an IP address and an address (telephone number) in use of the PSTN through a signal line 32a in correspondence with a one-touch dialing or abbreviated dialing station address.

The arrangement having the above blocks from the NCU 2 to the registration circuit 32, including the control circuit 20 to be described later, will be called a facsimile apparatus A.

A PSTN 40 is connected to the facsimile apparatus A through the signal line 2a and to a service provider 42 through a signal line 40c. The PSTN 40 is also connected to a PSTN closest to a facsimile apparatus B through a signal line 40b and then connected to the facsimile apparatus B through a signal line 40a and to a service provider 44 through a signal line 40d.

The service provider 42 close to the facsimile apparatus A is connected to the Internet 48 through a signal line 48a. The service provider 44 close to the facsimile apparatus B is connected to the Internet 48 through a signal line 48b.

A facsimile apparatus B 46 has the same functional blocks as those of the facsimile apparatus A, i.e., the blocks from the NCU 2 to the registration circuit 32 (including the control circuit 20).

In the first embodiment of the present invention, when facsimile communication through the Internet is executed by dial-up connection from the station A (facsimile apparatus A) to the station B (facsimile apparatus B), the control circuit 20 of the facsimile apparatus A controls to notify the apparatus at the station B using the PSTN that "communication through the Internet has been executed".

When the control circuit 20 at the station B (facsimile apparatus B) is notified, from the station A using the PSTN, that "communication through the Internet has been executed", the control circuit 20 connects itself to the service provider 44 on the receiving side by dial-up connection and performs POP to receive, from the service provider 44, the facsimile communication information through the Internet.

FIGS. 2 to 6 are flow charts showing the control flow of the control circuits 20 of the facsimile apparatuses A and B in the first embodiment of the present invention. In the first embodiment, the important communication button 22, the display circuit 24, and the time registration circuit 28 shown in FIG. 1 are not used.

Figure 2:
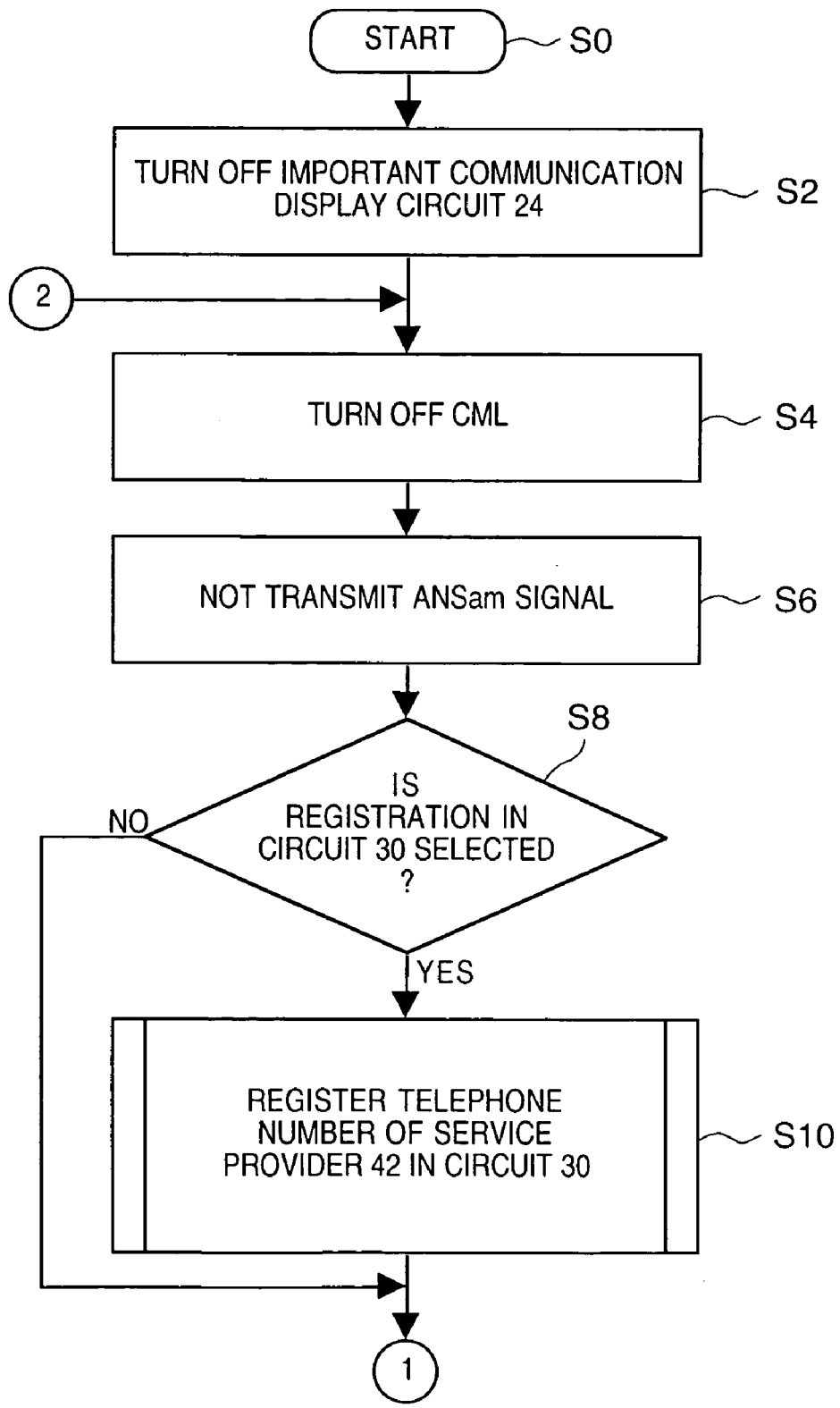
FIG. 2 is a flow chart showing the operation of the first embodiment.
Figure 3:
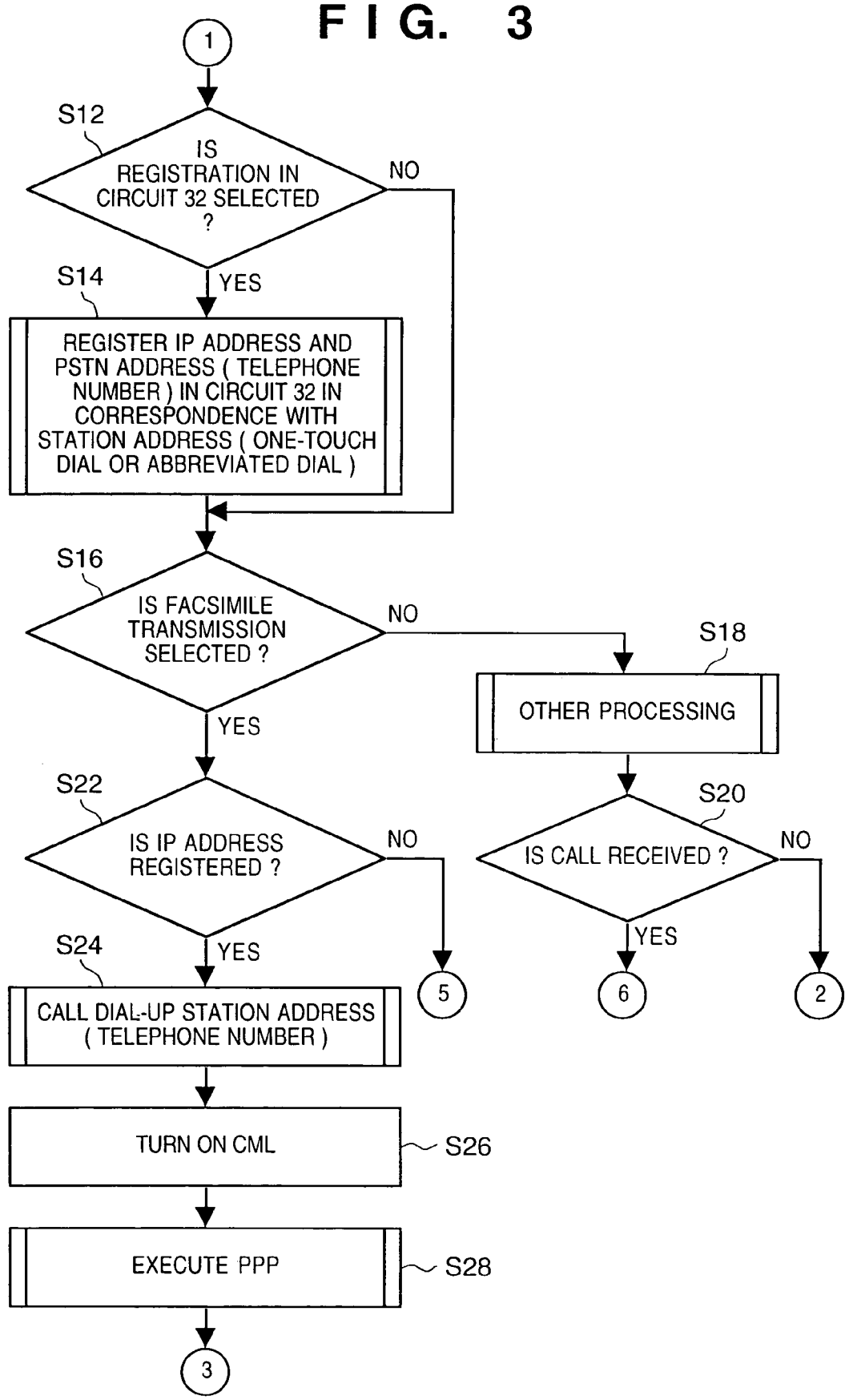
FIG. 3 is a flow chart showing the operation of the first embodiment.
Figure 4:
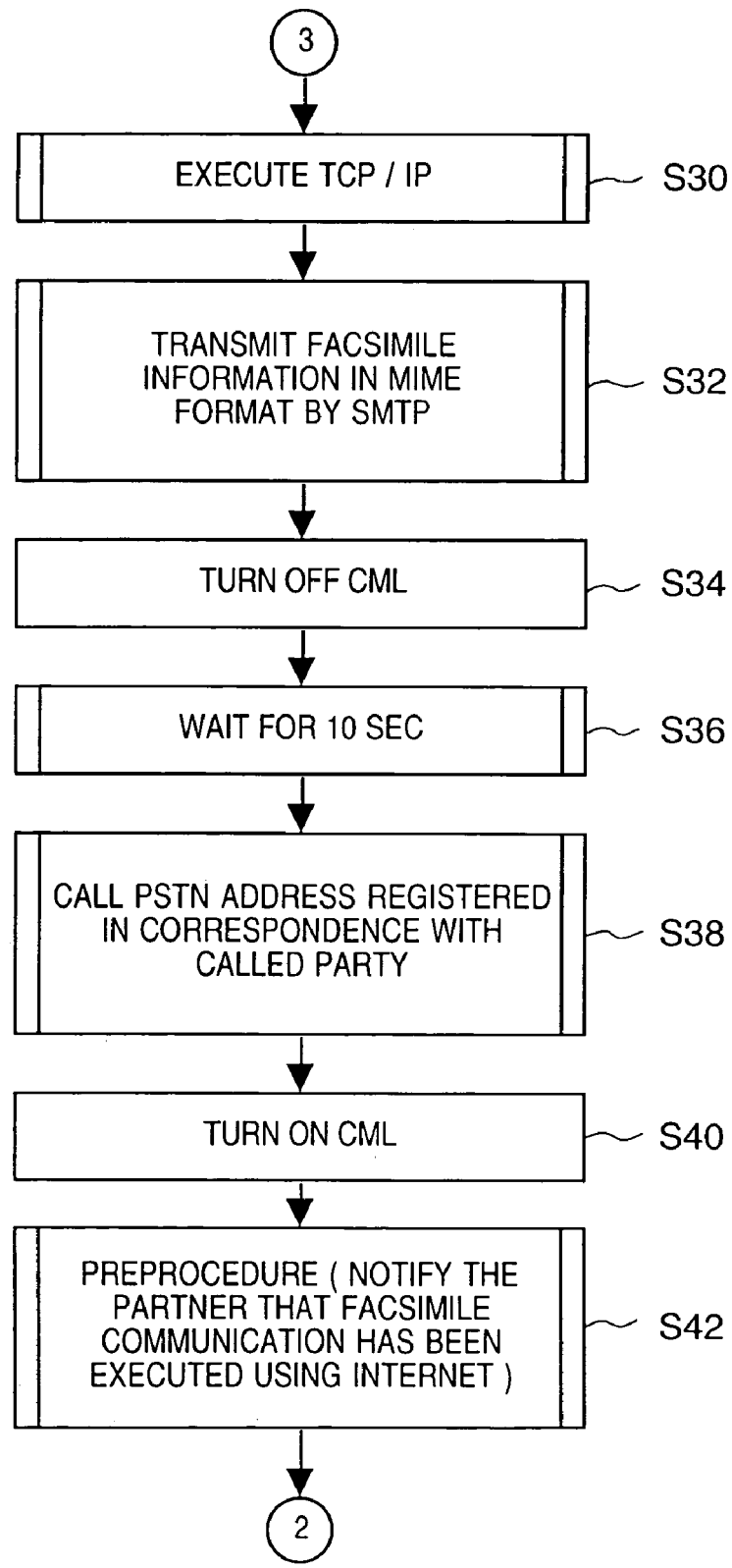
FIG. 4 is a flow chart showing the operation of the first embodiment.
Figure 5:
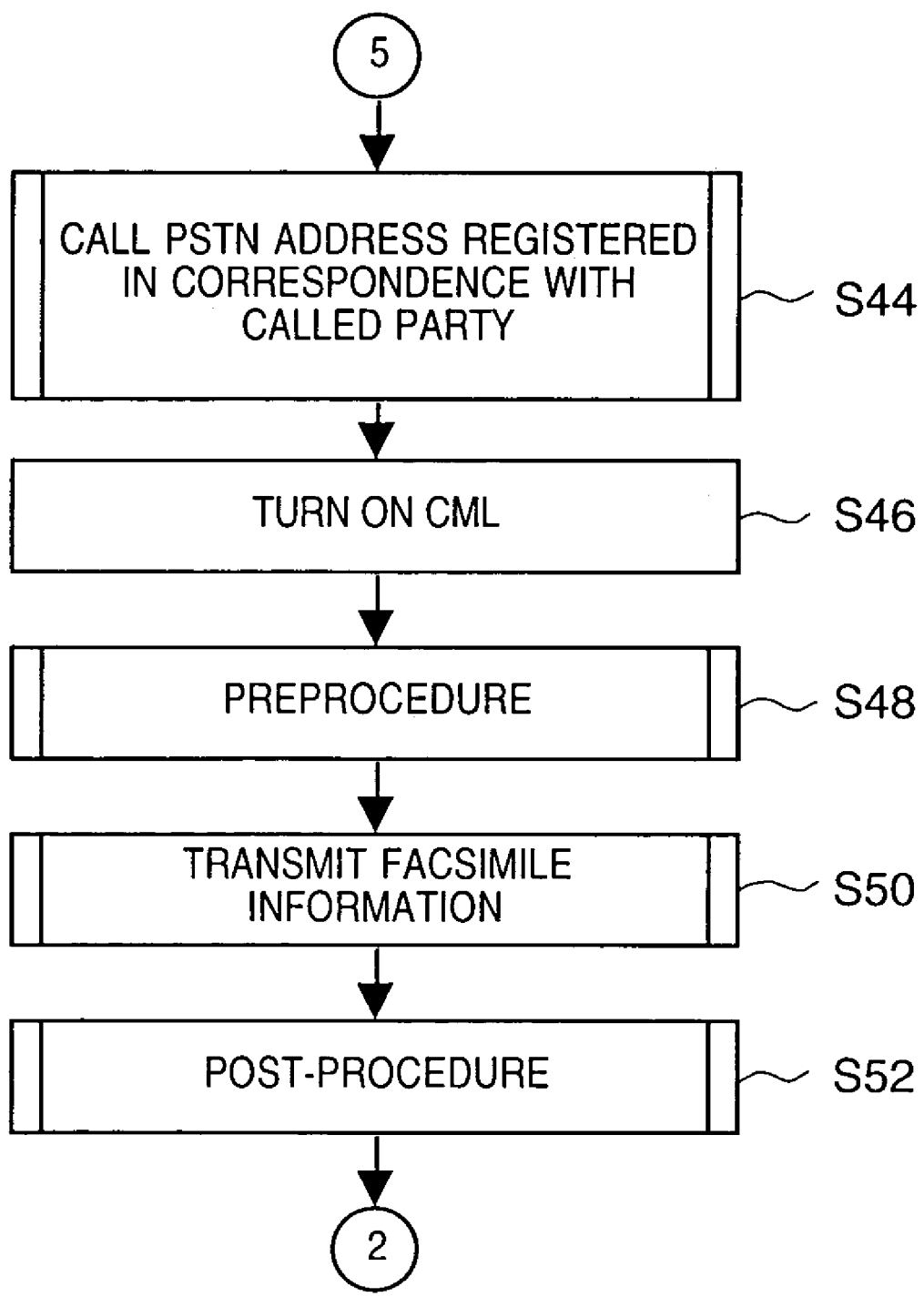
FIG. 5 is a flow chart showing the operation of the first embodiment.
Figure 6:
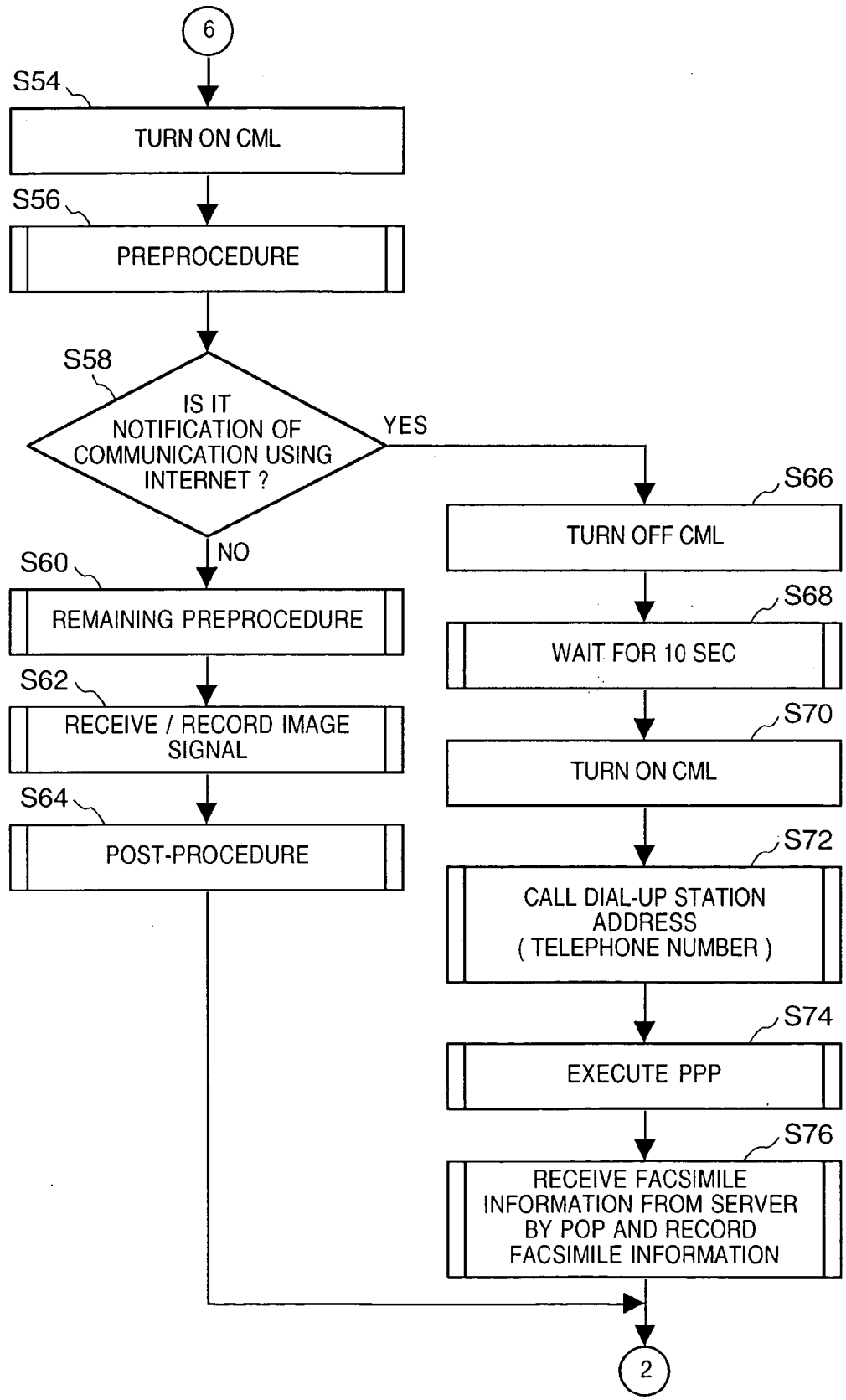
FIG. 6 is a flow chart showing the operation of the first embodiment.

In FIG. 2, the operation is started in step S0. In step S2, a clear pulse is generated on the signal line 20f to turn off the important communication display circuit 24. In step S4, a signal of level "0" is output to the signal line 20a to turn off the CML. In step S6, a signal of level "0" is output to the signal line 20d not to transmit the ANSam signal.

In step S8, information on the signal line 26a is received to determine whether registration in the registration circuit 30 is selected. If YES in step S8, the flow advances to step S10 to register the telephone number of the service provider 44 in the registration circuit 30 through the signal line 30a, and the flow advances to step S12; otherwise, the flow directly advances to step S12.

In step S12, information on the signal line 26a is received to determine whether registration in the registration circuit 32 is selected. If YES in step S12, the flow advances to step S14 to register the IP address and the address (telephone number) of the PSTN in the registration circuit 32 through the signal line 32a in correspondence with the station address (one-touch dial or abbreviated dial), and the flow advances to step S16. If NO in step S12, the flow directly advances to step S16.

In step S16, information on the signal line 26a is received to determine whether a facsimile transmission is selected. If YES in step S16, the flow advances to step S22. If NO in step S16, the flow advances to step S18 to execute other processing, and the flow advances to step S20.

In step S20, it is determined whether a call is received. If YES in step S20, the flow advances to step S54; otherwise, the flow returns to step S4.

In step S22, information on the signal line 32a is received to determine whether an IP address is registered in correspondence with the station address. If YES in step S22, the flow advances to step S24; otherwise, the flow advances to step S44.

In step S24, information on the signal line 30a is received, and the dial-up station address (telephone number) is called to establish connection to the service provider. In step S26, a signal of level "1" is output to the signal line 20c to turn on the CML.

In step S28, the PPP (Point to Point Protocol) is executed. In step S30, the TCP/IP (Transmission Control Protocol/Internet Protocol) is executed.

In step S32, facsimile information having a MIME (Multipurpose Internet Mail Extensions) format is transmitted using the SMTP (Simple Mail Transfer Protocol). In step S34, a signal of level "0" is output to the signal line 20a to turn off the CML.

In step S36, processing waits for 10 sec. In step S38, information on the signal line 32a is received, and the PSTN address (telephone number) registered in correspondence with the called party is called. In step S40, a signal of level "1" is output to the signal line 20a to turn on the CML. In step S42, the preprocedure is performed. The called party is notified that facsimile communication has been executed, and the flow returns to step S4.

In step S44, information on the signal line 32a is received, and the PSTN address (telephone number) registered in correspondence with the called party is called. In step S46, a signal of level "1" is output to the signal line 20a to turn on the CML. The preprocedure in step S48, facsimile communication transmission in step S50, and the postprocedure in step S52 are sequentially executed, and the flow returns to step S4.

In step S54, a signal of level "1" is output to the signal line 20a to turn on the CML. In step S56, the preprocedure is performed. In step S58, it is determined whether notification, representing that communication through the Internet has been executed, is received. If YES in step S58, the flow advances to step S66; otherwise, the flow advances to step S60.

In step S60, the remaining preprocedure is executed. In step S62, the image signal is received and recorded. In step S64, the post-procedure is executed. The flow returns to step S4.

In step S66, a signal of level "0" is output to the signal line 20a to turn off the CML. In step S68, processing is waited for 10 sec. In step S70, a signal of level "1" is output to the signal line 20a to turn on the CML.

In step S72, information on the signal line 30a is received, and the station address (telephone number) of the service provider to be connected by dial-up connection is called. In step S74, the PPP is executed. In step S76, the facsimile information by POP is received from the server and recorded. After this, the flow returns to step S4.

Second Embodiment

The second embodiment of the present invention will be described next. This embodiment will be also described with reference to the arrangement shown in FIG. 1.

In the second embodiment, an important communication button 22 and a display circuit 24 shown in FIG. 1 are used in the above-described first embodiment. When facsimile communication through the Internet is executed by dial-up connection from a station A to a station B, and important communication is selected with reference to the display circuit 24, the apparatus at the station B is notified, from the station A using the PSTN, that communication has been executed through the Internet. If important communication is not selected, the apparatus at the station B is not notified that communication through the Internet has been executed.

Figure 7A:
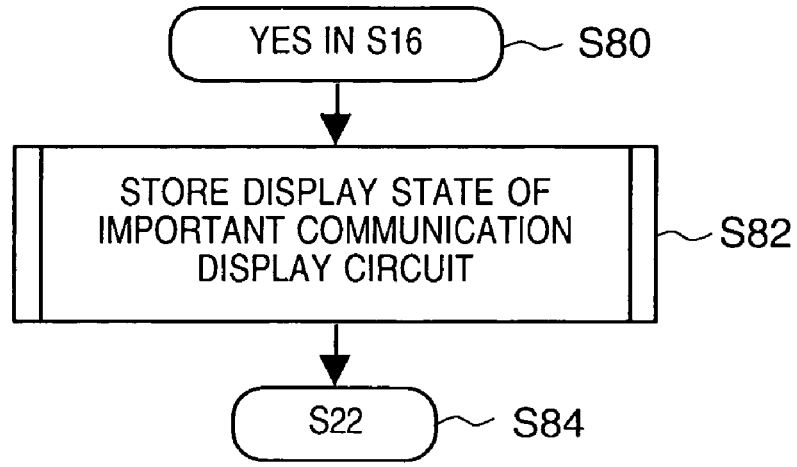
FIGS. 7A and 7B are flow charts showing the operation of the second embodiment.
Figure 7B:
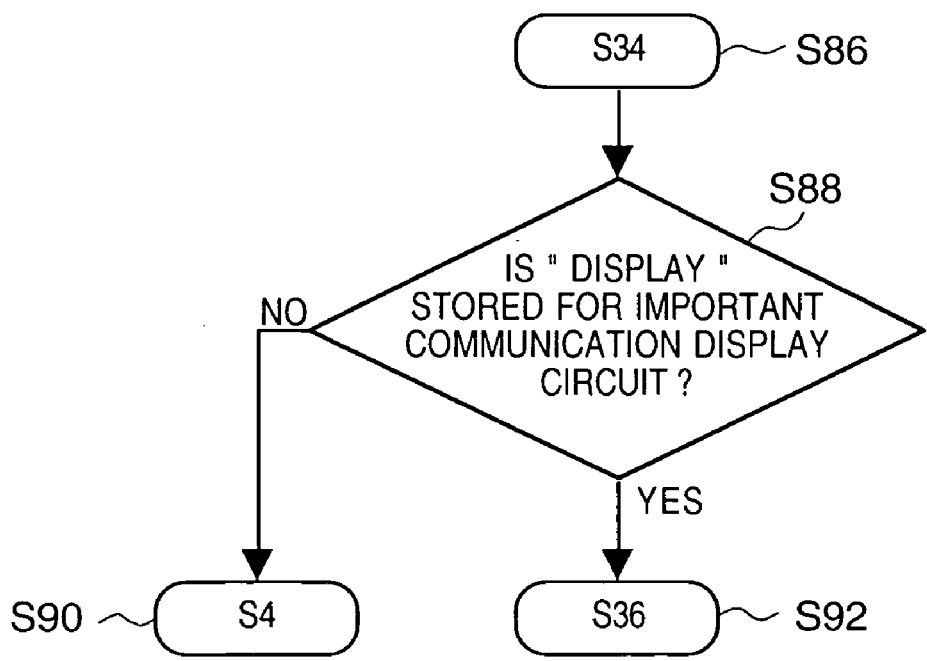

FIGS. 7A and 7B are flow charts showing the operation of the second embodiment except the same part as in the first embodiment (FIGS. 2 to 6).

Referring to FIG. 7A, step S80 corresponds to YES in step S16. In step S82, information on a signal line 24a is received, and the display state of the important communication display circuit 24 is stored. The subsequent step S84 corresponds to step S22.

Referring to FIG. 7B, step S86 corresponds to the above-described step S34. In step S88, the state of the important communication display circuit 24, which is stored in step S82, is determined. If display is being made, the flow advances to step S92 (S36); otherwise, the flow advances to step S90 (S4).

Third Embodiment

The third embodiment of the present invention will be described next. This embodiment will also be described with reference to the arrangement shown in FIG. 1.

In the third embodiment, the time of execution of POP processing is registered in a time registration circuit 28 in the above-described first or second embodiment. Dial-up connection is performed at the registered time, and facsimile communication information through the Internet is received by POP. Processing of the third embodiment will be described assuming processing of the first embodiment.

Figure 8A:
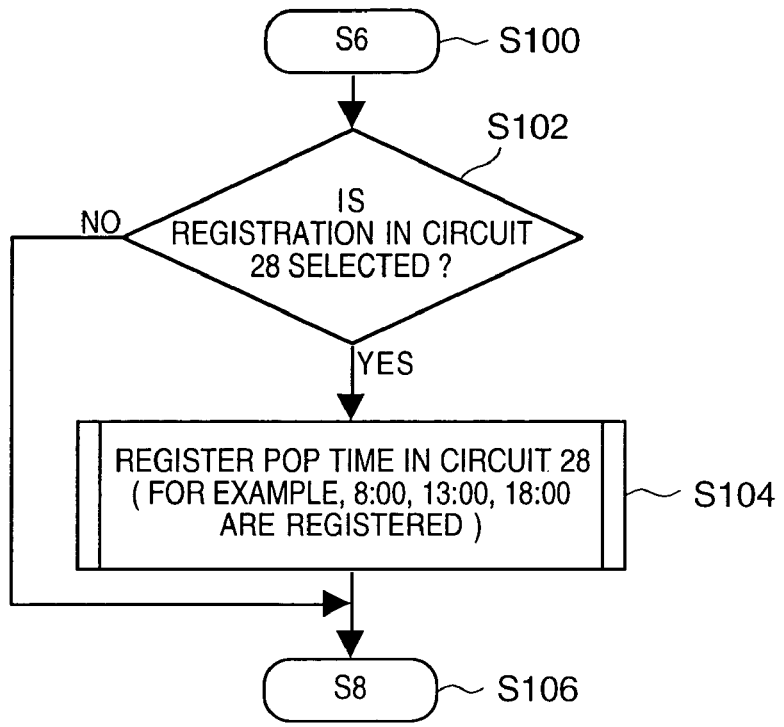
FIGS. 8A and 8B are flow charts showing the operation of the third embodiment.
Figure 8B:
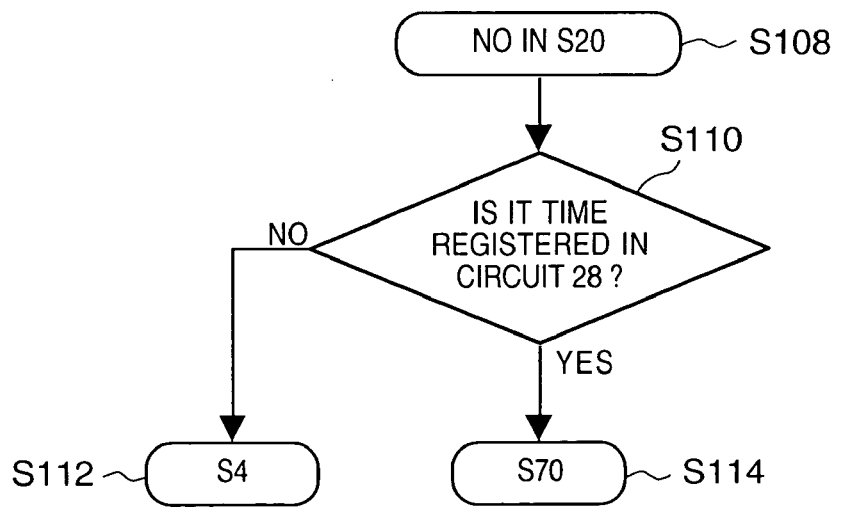
Figure 12A:
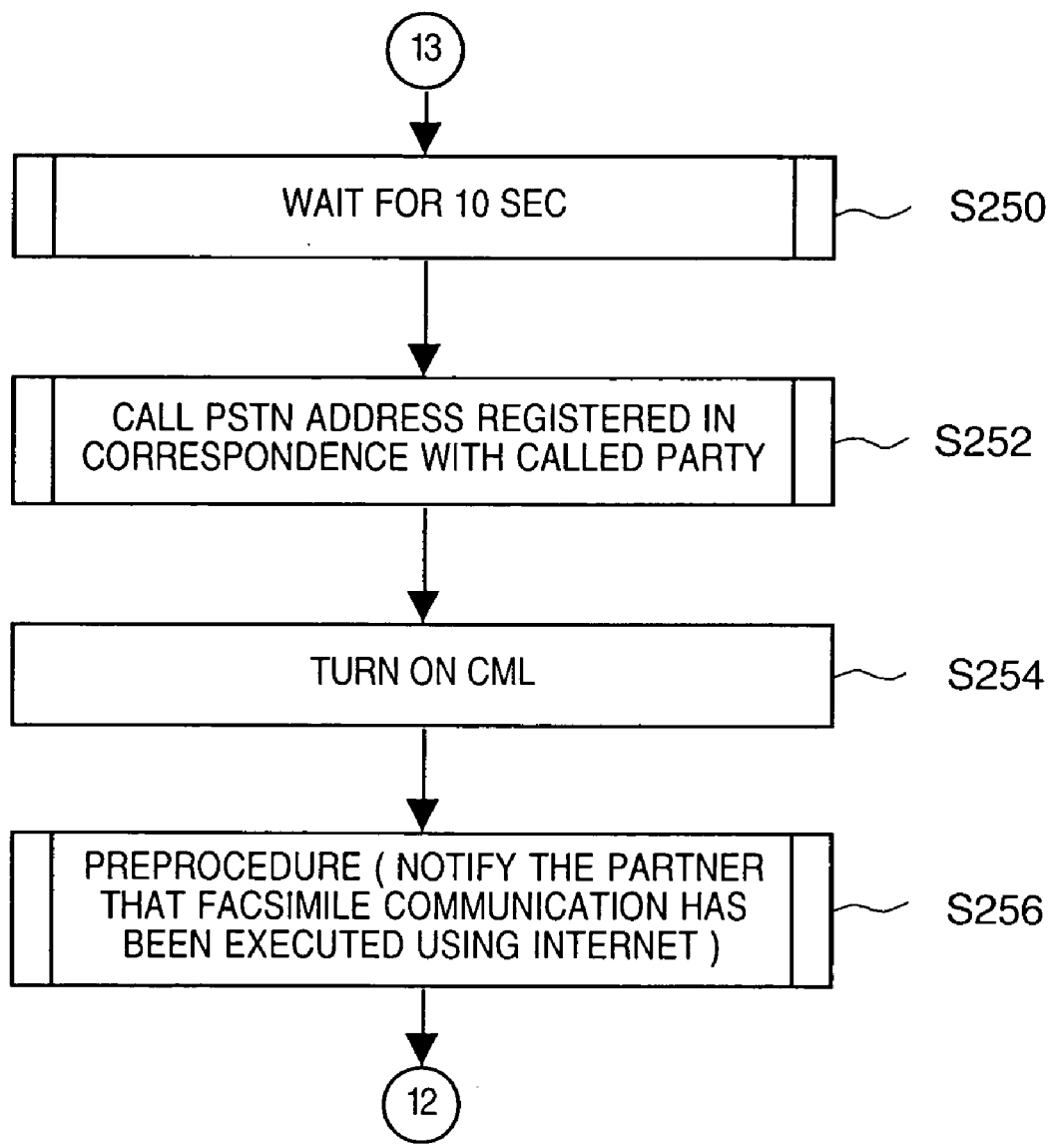
Figure 14A:
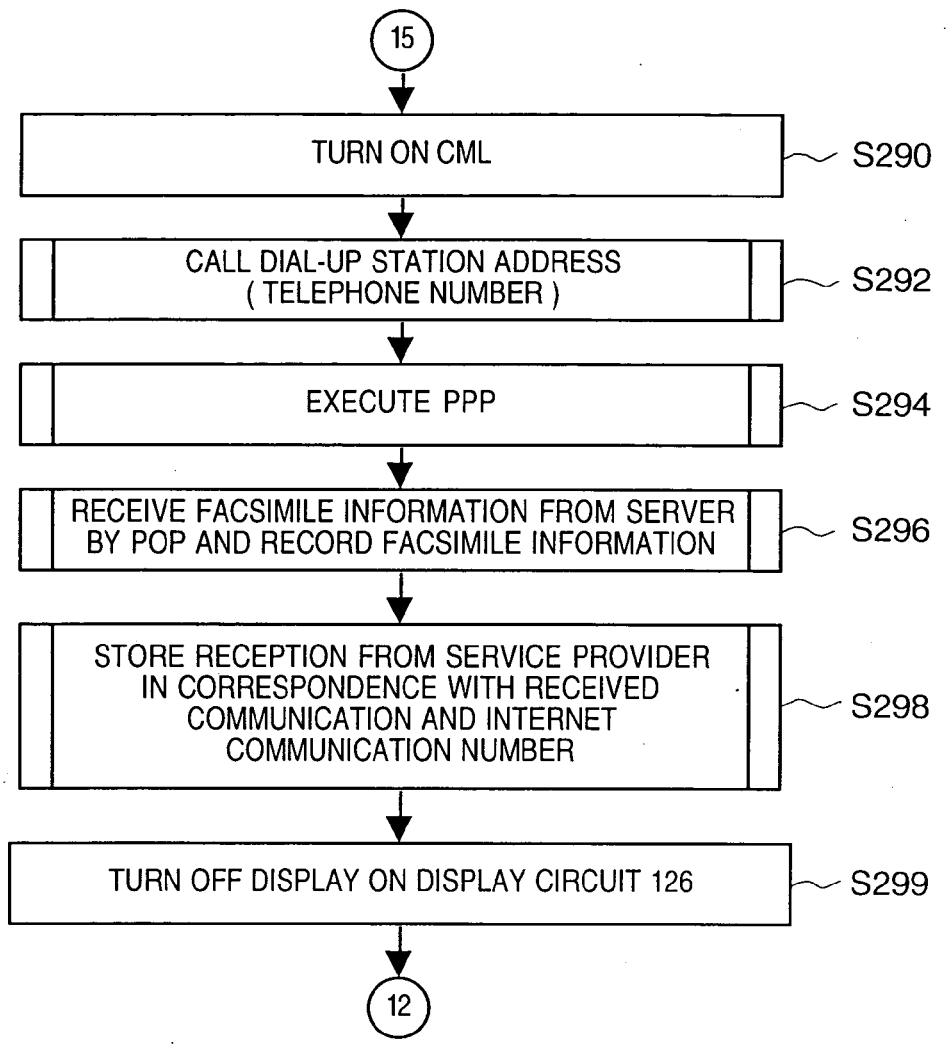
FIGS. 14A and 14B are flow charts showing the operation of the fourth embodiment.
Figure 14B:
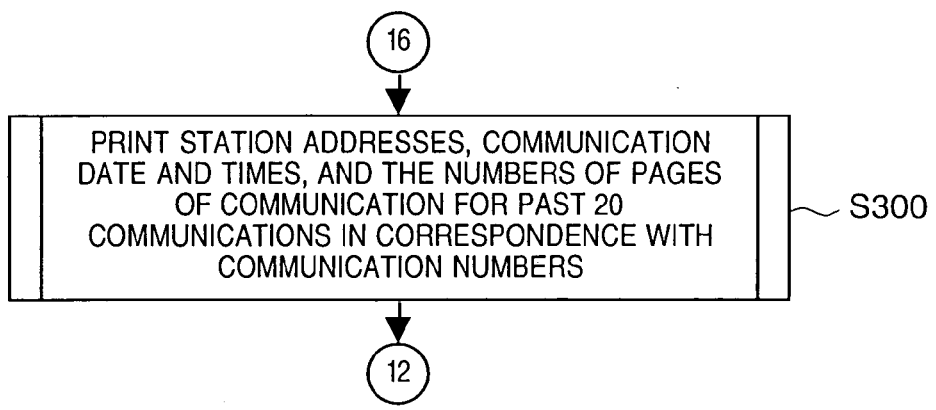
Figure 15:
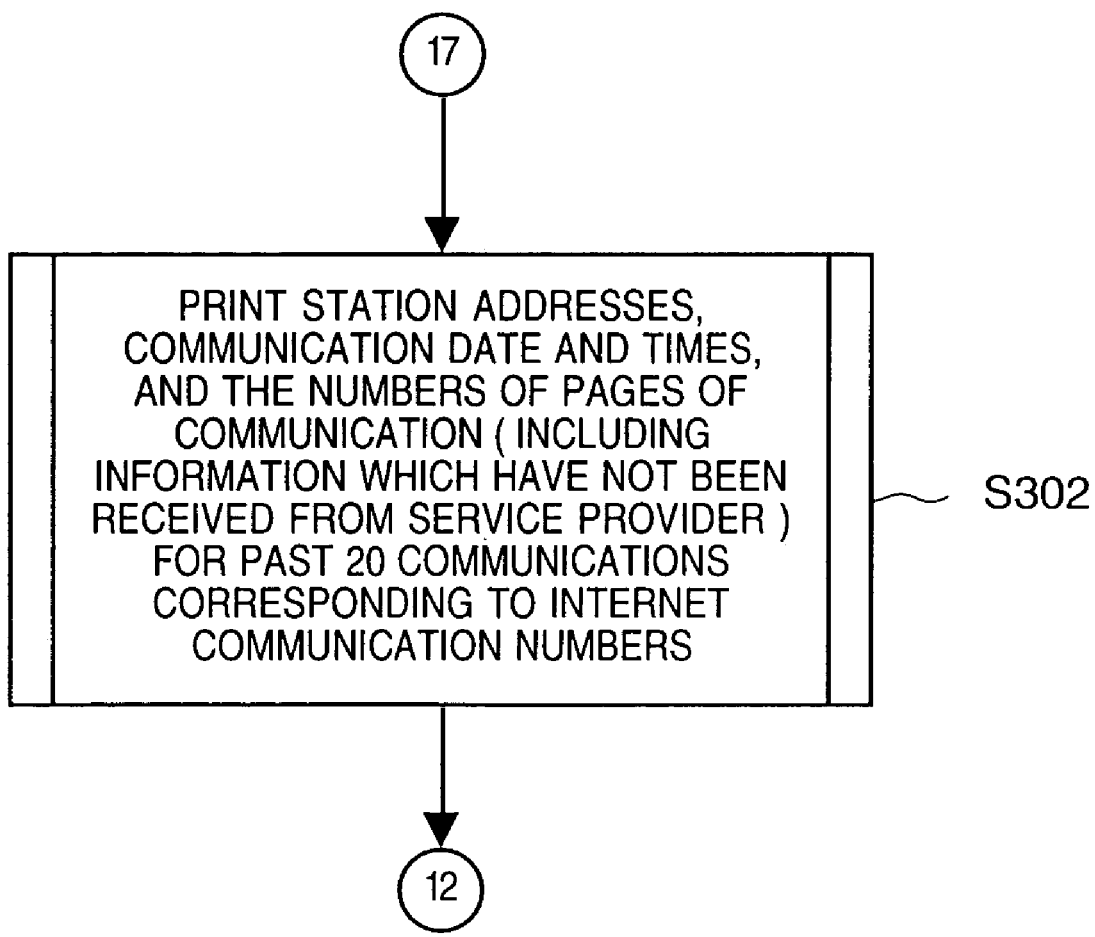
FIG. 15 is a flow chart showing the operation of the fourth embodiment.

FIGS. 8A and 8B are flow charts showing the operation of the third embodiment except the same part as in the first embodiment (FIGS. 2 to 6).

Referring to FIG. 8A, step S100 corresponds to the above-described step S6. In step S102, information on a signal line 26a is received to determine whether registration in the registration circuit 28 is selected. If YES in step S102, the flow advances to step S104; otherwise, the flow advances to step S106 (S8).

In step S104, the POP processing time is registered in the registration circuit 28 through a signal line 28a. For example, 8:00, 13:00, and 18:00 are registered. The subsequent step S106 corresponds to step S8.

Referring to FIG. 8A, step S108 corresponds to NO in step S20. In step S110, information on the signal line 28a is received to determine whether it is the time registered in the registration circuit 28. If YES in step S110, the flow advances to step S114 (S70); otherwise, the flow advances to step S112 (S4).

Fourth Embodiment

The fourth embodiment of the present invention will be described next.

FIG. 9 is a block diagram showing the arrangement of a facsimile apparatus according to the fourth and fifth embodiments.

An NCU (Network Control Unit) 102 is connected to a terminal of a line to use a telephone network for data communication or the like. The NCU 102 controls connection of a telephone switching network, switches to a data communication line, or holds a loop. When the signal level (signal line 120*a*) from a control circuit 120 is "0", the NCU 102 connects a telephone line 102*a* to the telephone 104 side. When the signal level is "1", the NCU 102 connects the telephone line 102*a* to the facsimile apparatus side. Normally, the telephone line 102*a* is connected to the telephone 104 side.

A hybrid circuit 106 separates a signal of the transmission system and a signal of the reception system from each other. A transmission signal from an addition circuit 112 is sent to the telephone line 102*a* via the NCU 102. A signal from the partner is received via the NCU 102 and sent to a modulator/demodulator 108 through a signal line 106*a*.

The modulator/demodulator 108 performs modulation and demodulation based on the ITU-T recommendations V.8, V.21, V.27ter, V.29, V.17, and V.34. The transmission mode is designated through a signal line 120*c*. The modulator/demodulator 108 receives a signal output to a signal line 120*b* and outputs modulated data to a signal line 108*a*, or receives a reception signal output to the signal line 106*a* and outputs demodulated data to a signal line 108*b*.

An ANSam sending circuit 110 sends an ANSam signal. When a signal of level "1" is output to a signal line 120*d*, the ANSam sending circuit 110 sends an ANSam signal to a signal line 110*a*. When a signal of level "0" is output to the signal line 120*d*, the ANSam sending circuit 110 sends no signal to the signal line 110*a*.

The addition circuit 112 receives information on the signal line 108*a* and information on the signal line 110*a* and outputs the sum to a signal line 112*a*. A read circuit 114 reads the original image and outputs the read image data to a signal line 114*a*. A recording circuit 116 sequentially records information output to a signal line 120*e* in units of lines.

A memory circuit 118 is used to store read data (data before coding) or coded information, or store received information or decoded information.

An operation section 122 has one-touch dial keys, abbreviated dial keys, a ten-key pad, "*"/"#" keys, registration keys for registration circuits 124, 128, and 130, set keys, a start key, and other function keys. Depressed key information is output to a signal line 122*a*.

When communication through the Internet is executed, and information representing facsimile communication through the Internet is received through the PSTN, the important station address registration circuit 124 is used to register, through a signal line 124*a*, an important station address which is to be immediately connected to a service provider by dial-up connection and execute facsimile reception from the service provider.

When it is notified through the PSTN that communication through the Internet has been executed, a display circuit 126 displays that information and the terminal information of the calling party upon receiving information on a signal line 120*f*.

The station address registration circuit 128 is used to register the station address for dial-up connection to the service provider through a signal line 128*a*.

The address registration circuit 130 is used to register an IP address and a PSTN address (telephone number) through a signal line 130*a* in correspondence with a one-touch dialing or abbreviated dialing station address.

A reception button 132 is depressed to receive information from the service provider by POP processing. When this button is depressed, an ON pulse is generated on a signal line 132*a*.

The arrangement having the above blocks from the NCU 102 to the reception button 132, including the control circuit 120 to be described later, will be called a facsimile apparatus A.

A PSTN 140 is connected to the facsimile apparatus A through the signal line 102*a* and to a service provider 142 through a signal line 140*c*. The PSTN 140 is also connected to a PSTN closest to a facsimile apparatus B through a signal line 140*b* and then connected to the facsimile apparatus B through a signal line 140*a* and to a service provider 144 through a signal line 140*d*.

The service provider 142 close to the facsimile apparatus A is connected to the Internet 148 through a signal line 148*a*. The service provider 144 close to the facsimile apparatus B is connected to the Internet 148 through a signal line 148*b*.

A facsimile apparatus B 146 has the same functional blocks as those of the facsimile apparatus A, i.e., the blocks from the NCU 102 to the reception button 132 (including the control circuit 120).

In the fourth embodiment of the present invention, when facsimile communication through the Internet is executed by dial-up connection from the station A (facsimile apparatus A) to the station B (facsimile apparatus B), the control circuit 120 of the facsimile apparatus A controls to notify the apparatus at the station B using the PSTN that communication through the Internet has been executed.

The control circuit 120 at the station B (facsimile apparatus B) notified of it displays that the communication through the Internet has been executed and the station address information of the calling party, and determines in accordance with selection of the operator whether dial-up connection is to be performed to receive the facsimile communication information through the Internet by POP.

In the facsimile apparatus B, the communication management information representing that communication through the Internet has been executed is displayed on a list independently of management information associated with normal transmission/reception. In addition, the facsimile apparatus B displays whether reception of the facsimile communication information from the service provider, which corresponds to this notification, is complete.

FIGS. 10 to 15 are flow charts showing the control flow of the control circuits 120 of the facsimile apparatuses A and B in the fourth embodiment. In the fourth embodiment, the important station address registration circuit 124 is not used.

In FIG. 10, the operation is started in step S200. In step S202, "1" is set as the communication number used to manage transmission or reception. In step S204, "1" is set as the communication number (Internet communication number) with which it is notified using the PSTN that facsimile communication through the Internet has been executed.

In step S206, nothing is displayed on the display circuit 126 through the signal line 120*f*. In step S208, a signal of level "0" is output to the signal line 120*a* to turn off the CML. In step S210, a signal of level "0" is output to the signal line 120*d* not to send the ANSam signal.

In step S212, information on the signal line 122*a* is received to determine whether registration on the registration circuit 128 is selected. If YES in step S212, the flow advances to step S214 to register the telephone number of the service provider in the registration circuit 128 through the signal line 128*a*, and the flow advances to step S216. If NO in step S212, the flow directly advances to step S216.

In step S216, information on the signal line 122*a* is received to determine whether registration in the registration circuit 130 is selected. If YES in step S216, the flow advances to step S218 to register, through the signal line 130*a*, the IP address and the address (telephone number) of the PSTN in the registration circuit 130 in correspondence with the station address (one-touch dial or abbreviated dial), and the flow advances to step S220. If NO in step S216, the flow directly advances to step S220.

In step S220, information on the signal line 122*a* is received to determine whether a facsimile transmission is selected. If YES in step S220, the flow advances to step S232; otherwise, the flow advances to step S222.

In step S222, it is determined whether a call is received. If YES in step S222, the flow advances to step S268; otherwise, the flow advances to step S224 to perform other processing, and the flow advances to step S226.

In step S226, information on the signal line 132*a* is received to determine whether reception from the service provider is selected by the reception button 132. If YES in step S226, the flow advances to step S290; otherwise, the flow advances to step S228. In step S228, information on the signal line 122*a* is received to determine whether output of a communication result report is selected. If YES in step S228, the flow advances to step S300; otherwise, the flow advances to step S230.

In step S230, information on the signal line 122*a* is received to determine whether output of a list with which it is notified through the PSTN of reception through the Internet and output of a reception result report through the Internet, which represents whether the communication (reception) is received from the Internet by the terminal by POP processing are selected. If YES in step S230, the flow advances to step S302; otherwise, the flow returns to step S208.

In step S232, it is determined whether the IP address is registered through the signal line 130*a* for the station address to which a facsimile transmission is selected. If YES in step S232, the flow advances to step S234; otherwise, the flow advances to step S258.

In step S234, information on the signal line 128*a* is received to call the station address (telephone number) of dial-up connection. In step S236, a signal of level "1" is output to the signal line 120*a* to turn on the CML. In step S238, the PPP is executed. In step S240, the TCP/IP is executed.

In step S242, the facsimile information having the MIME format is transmitted using the SMTP. In step S244, a signal of level "0" is output to the signal line 120*a* to turn off the CML.

In step S246, the station address, the communication date and time, and the number of pages of communication are stored in the control circuit 120 in correspondence with the communication number. In step S248, the value of the communication number is incremented by one. In step S250, processing waits for 10 sec. In step S252, information on the signal line 130*a* is received to call the PSTN address registered in correspondence with the called party. In step S254, a signal of level "1" is output to the signal line 120*a* to turn on the CML.

In step S256, the preprocedure is executed. The partner is notified that facsimile communication using the Internet has been executed, and the flow returns to step S208.

In step S258, information on the signal line 130*a* is received to call the PSTN address registered in correspondence with the called party. In step S260, a signal of level "1" is output to the signal line 120*a* to turn on the CML. In step S262, the facsimile information is transmitted.

In step S264, the station address, the communication date and time, and the number of pages of communication are stored in the control circuit 120 in correspondence with the communication number. In step S266, the value of the communication number is incremented by one, and the flow returns to step S208.

In step S268, a signal of level "1" is output to the signal line 120*a* to turn on the CML. In step S270, the preprocedure is executed. In step S272, it is determined whether notification, representing that communication using the Internet has been executed, is received. If YES in step S272, the flow advances to step S274; otherwise, the flow advances to step S282.

In step S274, a signal of level "1" is output to the signal line 120*a* to turn on the CML. In step S276, information representing that reception using the Internet has been made and its station address are displayed on the display circuit 126 through the signal line 120*f*. In step S278, the station address, the communication date and time, the number of pages of communication, and information representing non-reception from the service provider are stored in the control circuit 120 in correspondence with the Internet communication number. In step S280, the value of the Internet communication number is incremented by one, and the flow returns to step S208.

In step S282, a signal of level "1" is output to the signal line 120*a* to turn on the CML. In step S284, the facsimile information is received and recorded. In step S286, the station address, the communication date and time, and the number of pages of communication are stored in the control circuit 120 in correspondence with the communication number. In step S288, the value of the communication number is incremented by one, and the flow returns to step S208.

In step S290, a signal of level "1" is output to the signal line 120*a* to turn on the CML. In step S292, information on the signal line 128*a* is received to call the dial-up station address (telephone number).

In step S294, the PPP is executed. In step S296, the facsimile information is received from the server by POP and recorded. In step S298, information representing reception from the service provider is stored in the control circuit 120 as the Internet communication number management information (management information stored in step S278 in FIG. 13) corresponding to the received communication. After this, in step S299, display on the display circuit 126 is canceled through the signal line 120*f*, and the flow returns to step S208.

In step S300, the station addresses, the communication date and times, and the numbers of pages of communication for the past 20 communications are printed in correspondence with the communication numbers. In step S302, the station addresses, the communication date and times, and the numbers of pages of communication for the past 20 communications are printed in correspondence with the Internet communication numbers (pieces of information which have not been output from the service provider yet are also printed), and the flow returns to step S208.

Fifth Embodiment

The fifth embodiment of the present invention will be described next. The fifth embodiment will also be described with reference to the above-described arrangement shown in FIG. 9.

In the fifth embodiment, an important station address registration circuit 124 is used in the fourth embodiment. When it is notified that facsimile communication through the Internet has been executed by dial-up connection, only for a station address registered in the registration circuit 124, POP processing is executed by dial-up connection, and processing of immediately receiving facsimile communication information through the Internet is executed. When POP processing is to be executed by dial-up connection to receive the facsimile communication information through the Internet, all pieces of facsimile communication information addressed to the self apparatus and received by the service provider are received.

Figure 16A:
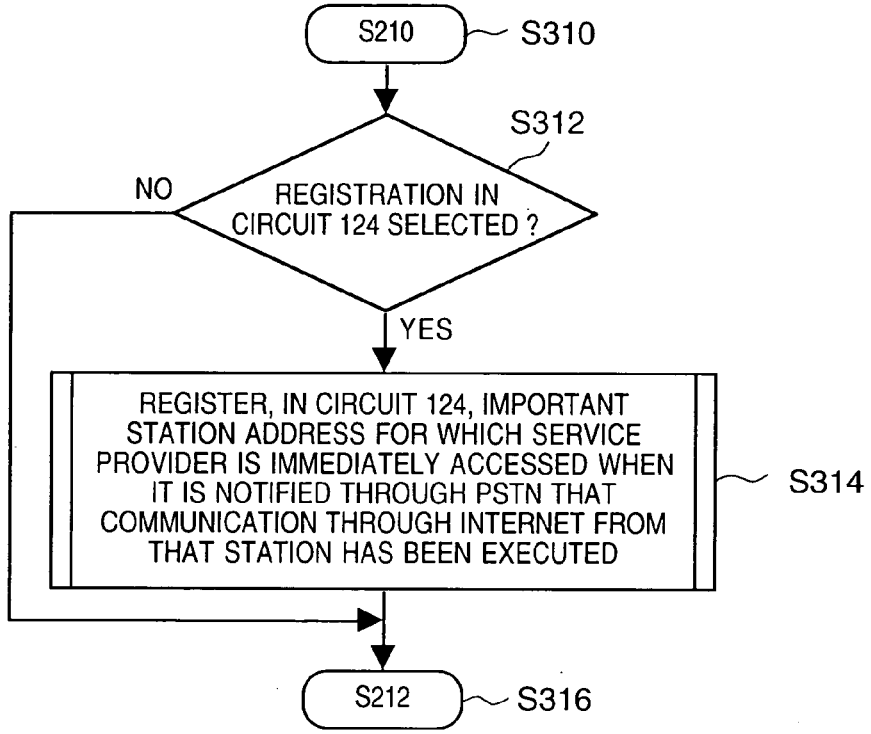
FIGS. 16A and 16B are a flow charts showing the operation of the fifth embodiment.
Figure 16B:
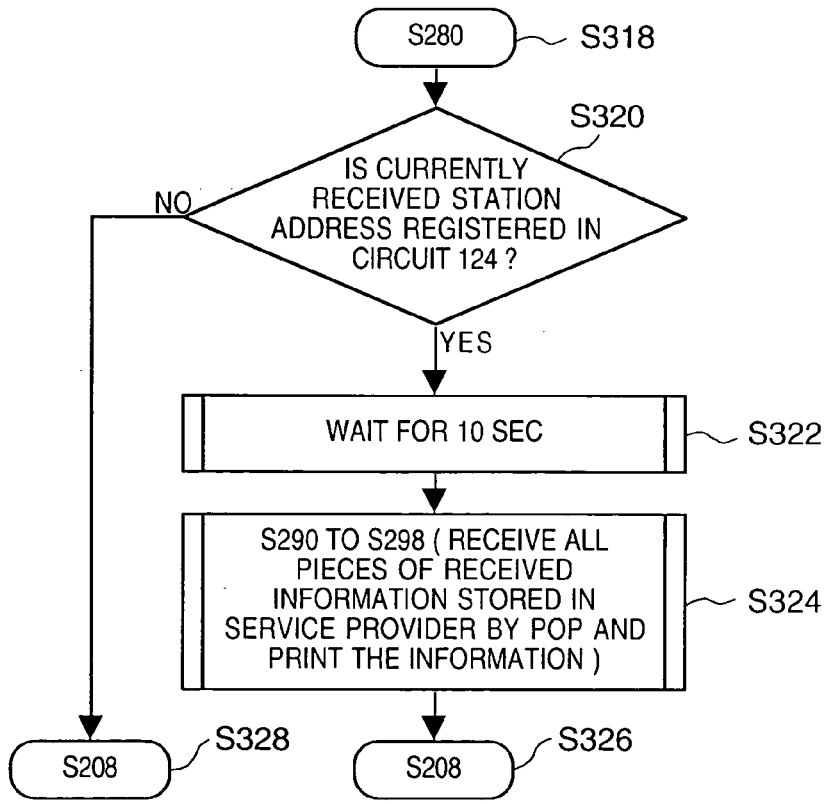

FIGS. 16A and 16B are flow charts showing the operation of the fifth embodiment except the same part as in the fourth embodiment (FIGS. 10 to 15).

In FIG. 16A, step S310 corresponds to the above-described step S210. In step S312, information on a signal line 122a is received to determine whether registration in the registration circuit 124 is selected. If YES in step in step S312, the flow advances to step S314; otherwise, the flow advances to step S316 (S212).

In step S314, an important station address for which the service provider is to be immediately accessed upon being notified using the PSTN that communication through the Internet from this station has been executed is registered in the registration circuit 124 through a signal line 124a. After this, the flow advances to step S316 (S212).

In FIG. 16B, step S318 corresponds to the above-described step S180. In step S320, it is determined whether the station address received currently is registered in the registration circuit 124. If YES in step S320, the flow advances to step S322; otherwise, the flow advances to step S328 (S208).

In step S322, processing waits for 10 sec. In step S324, processing from step S290 to step S298 is performed. All pieces of received information stored in the service provider are received by POP processing and printed. Step S326 correspond to step S208.

In the above embodiments, a facsimile apparatus of stand-alone type has been exemplified. However, the present invention is not limited to this. The present invention can be applied to data communication control in a general data processing system wherein, e.g., a copy function, an electronic file function, and a data processing function are combined with the communication function.

As described above, according to the first to fifth embodiments of the present invention, when facsimile communication through the Internet is executed by dial-up connection to the service provider of the Internet, the receiver can recognize it and appropriately cope with the communication, so a convenient system can be provided.

According to the first embodiment of the present invention, when facsimile communication through the Internet is executed by dial-up connection to the service provider of the Internet, the receiver can recognize it and also immediately receive the facsimile information from the service provider, so a convenient system can be provided.

According to the second embodiment of the present invention, when Internet communication is executed by dial-up connection to the service provider of the Internet, execution of communication can be notified using the PSTN in accordance with the degree of importance of the communication, so the reliability can be ensured even for communication through the Internet.

According to the third embodiment of the present invention, a system which allows the user to always read the received information at a specific time selected by the user, e.g., after supper by dial-up connection to the service provider of the Internet can be provided.

According to the fourth embodiment of the present invention, when the user recognizes, from notification using the PSTN, that facsimile reception has been made through the Internet by dial-up connection to the service provider of the Internet, the user determines the degree of importance of the communication. If the degree of importance is high, the facsimile communication information through the Internet can be received by POP, so a convenient system can be provided.

According to the fifth embodiment of the present invention, when the user recognizes, from notification using the PSTN, that facsimile reception has been made through the Internet by dial-up connection to the service provider of the Internet, the user determines the degree of importance of the communication using the station address of the calling party. If the station address indicates an important station, dial-up connection can be immediately performed to receive the facsimile communication information through the Internet by POP, so a convenient system can be provided.

According to the fifth embodiment, facsimile communication information through the Internet from a calling party which is not so important can also be reliably received, so a convenient system can be provided. According to the fourth embodiment of the present invention, pieces of facsimile communication information which have been received at the service provider can be listed by dial-up connection to the service provider of the Internet, so a convenient system can be provided.

Sixth Embodiment

FIG. 17 is a block diagram showing the arrangement of a facsimile apparatus according to the sixth embodiment of the present invention.

An NCU (Network Control Unit) 202 is connected to a terminal of a line to use a telephone network for data communication or the like. The NCU 202 controls connection of a telephone switching network, switches to a data communication line, or holds a loop. When the signal level (signal line 220a) from a control circuit 220 is "0", the NCU 202 connects a telephone line 202a to the telephone 204 side. When the signal level is "1", the NCU 202 connects the telephone line 202a to the facsimile apparatus side. Normally, the telephone line 202a is connected to the telephone 204 side.

A hybrid circuit 206 separates a signal of the transmission system and a signal of the reception system from each other. A transmission signal from an addition circuit 212 is sent to the telephone line 202a via the NCU 202. A signal from the partner is received via the NCU 202 and sent to a modulator/demodulator 208 through a signal line 206a.

The modulator/demodulator 208 performs modulation and demodulation based on the ITU-T recommendations V.8, V.21, V.27ter, V.29, V.17, and V.34. The transmission mode is designated through a signal line 220c. The modulator/demodulator 208 receives a signal output to a signal line 220b and outputs modulated data to a signal line 208a, or receives a reception signal output to the signal line 206a and outputs demodulated data to a signal line 208b.

An ANSam sending circuit 210 sends an ANSam signal. When a signal of level "1" is output to a signal line 220d, the ANSam sending circuit 210 sends an ANSam signal to a signal line 210a. When a signal of level "0" is output to the signal line 220d, the ANSam sending circuit 210 sends no signal to the signal line 210a.

The addition circuit 212 receives information on the signal line 208a and information on the signal line 210a and outputs the sum to a signal line 212a. A read circuit 214 reads the original image and outputs the read image data to a signal line 214a. A recording circuit 216 sequentially records information output to a signal line 220e in units of lines.

A memory circuit 218 is used to store raw information of read data or coded information, or store received information or decoded information.

A dial-up station address registration circuit 222 is used to register a station address to be connected by dial-up connection. The dial-up station address registration circuit 222 registers the telephone number of a service provider 244 through a signal line 222a.

An address registration circuit 224 registers, through a signal line 224a, the IP (Internet Protocol) address through the Internet and the address (telephone number) of the PSTN (Public Switched Telephone Network) in correspondence with the station address (one-touch dial).

A reception button 226 is depressed for dial-up connection to the service provider to receive the facsimile reception information by POP (Post Office Protocol). When this button is depressed, an ON pulse is generated on a signal line 226a.

After execution of facsimile communication through the Internet, when notification of execution of the communication through the Internet and description information of the communication through the Internet are to be transmitted through the PSTN, a selection button 228 is used to select whether a summary or information of the first page is to be transmitted as the description information. When this button is depressed, an ON pulse is generated on a signal line 228a.

A display circuit 230 displays the condition selected by the selection button 228, i.e., whether a summary or information of the first page is to be transmitted through the PSTN as description information. When a clear pulse is generated on a signal line 220f, "transmission of first page" is displayed. After this, every time a clear pulse is generated on the signal line 228a, display repeatedly changes: "transmission of summary"→"transmission of first page"→"transmission of summary". When "transmission of first page" is displayed, the display circuit 230 outputs a signal of level "0" to a signal line 230a. When "transmission of summary" is displayed, the display circuit 230 outputs a signal of level "1" to the signal line 230a.

An operation section 232 inputs various conditions to the facsimile apparatus of this embodiment and has one-touch dial keys, abbreviated dial keys, a ten-key pad, "*"/"#" keys, registration keys for the circuit 222 and 224, set keys, a start key, and other function keys. Depressed key information is output to a signal line 232a.

A summarized text generation circuit 234 receives information output to the signal line 214a from a summarization start pulse to a summarization end pulse, which are output to a signal line 220g. After generation of the summarization end pulse, summarized text is output to a signal line 234a.

The facsimile apparatus having the blocks 202 to 232 will be called a facsimile apparatus A. A facsimile apparatus B 248 is another facsimile apparatus having the same functions as described above.

A PSTN 240 is connected to the facsimile apparatus A through the signal line 202a and to the facsimile apparatus B through a signal line 240b. The PSTN close to the facsimile apparatus A is connected to the PSTN close to the facsimile apparatus B through a signal line 240a. The PSTN 240 is connected to the service provider 244 close to the facsimile apparatus A through a signal line 240c and also connected to a service provider 246 close to the facsimile apparatus B through a signal line 240d.

The Internet 242 is connected to the service provider 244 through a signal line 242a and to the service provider 246 through a signal line 242b.

The control circuit 220 controls the entire facsimile apparatus A capable of facsimile communication through the Internet by dial-up connection. Especially, in this embodiment, when the station A connects itself to the ISP by dial-up connection, and makes communication through the Internet to the TCP/IP address of the station B, the station A calls the station B using the PSTN to send information representing that communication through the Internet has been executed, description of facsimile communication through the Internet, the number of pages of communication through the Internet, and the time of Internet communication are transmitted in the standard mode (main scanning: 8 pel/mm and subscanning: 3.85 line/mm) independently of the line density through the Internet.

Figure 18:
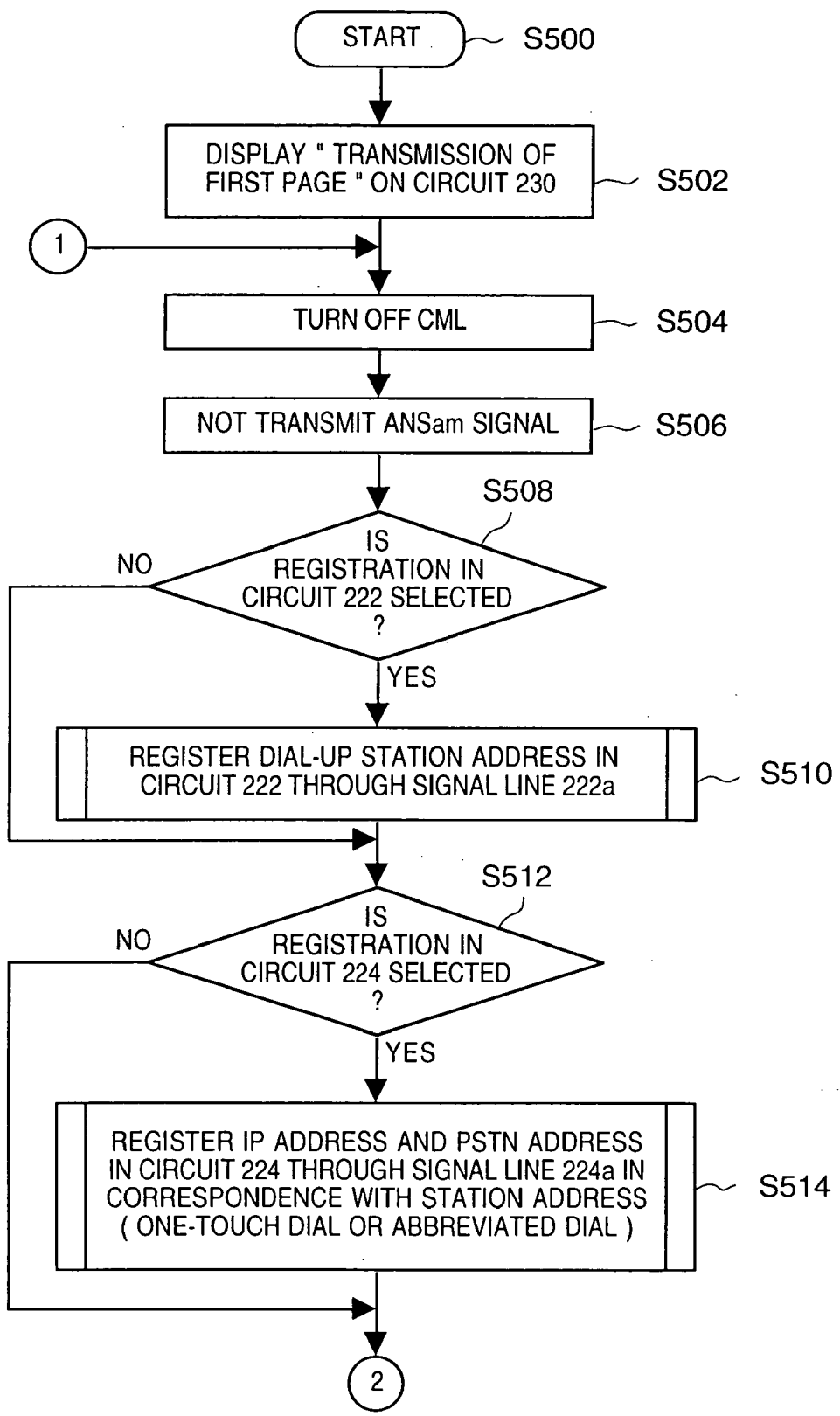
FIG. 18 is a flow chart showing the operation of the sixth embodiment.
Figure 19:
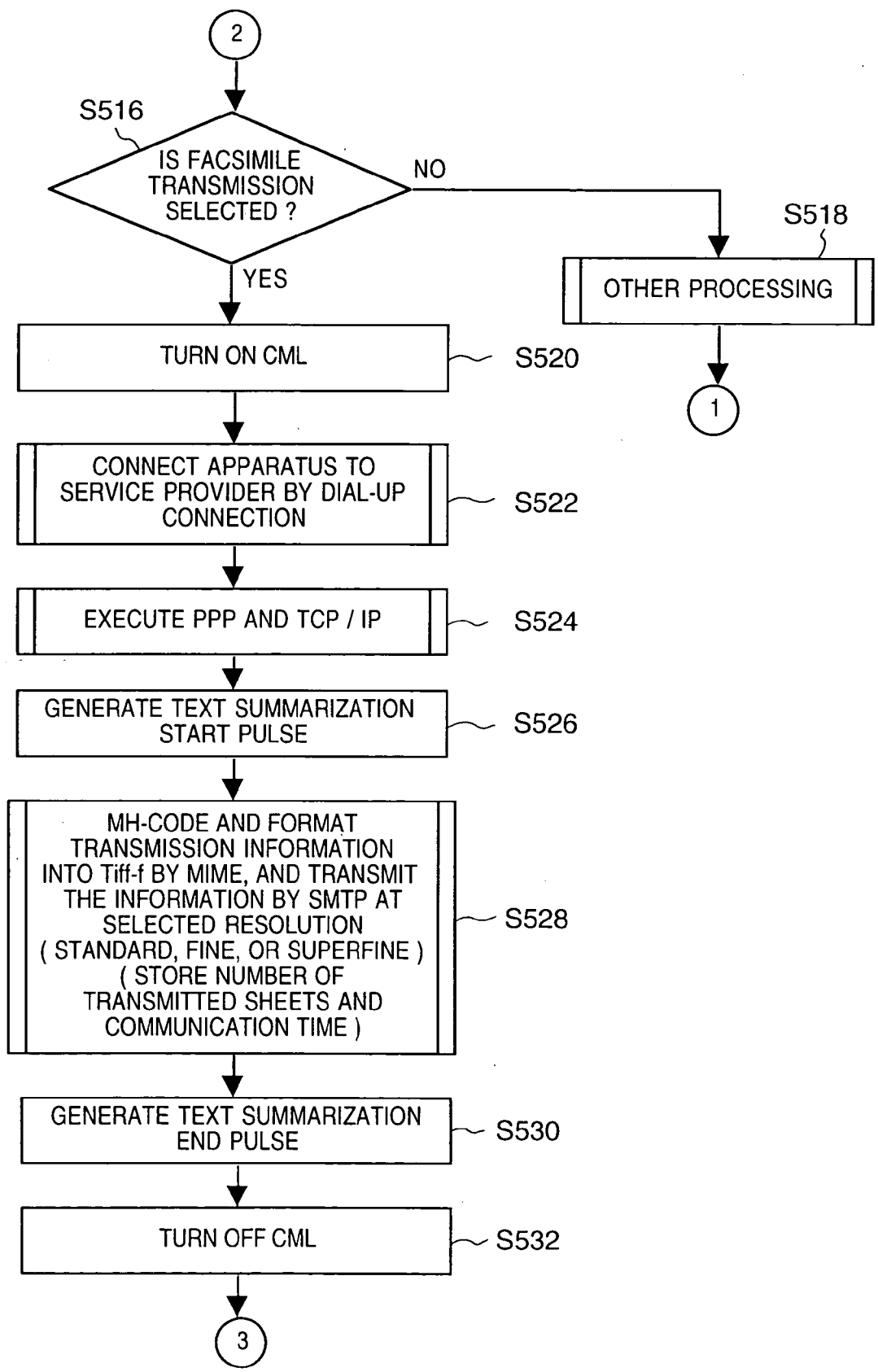
FIG. 19 is a flow chart showing the operation of the sixth embodiment.
Figure 20:
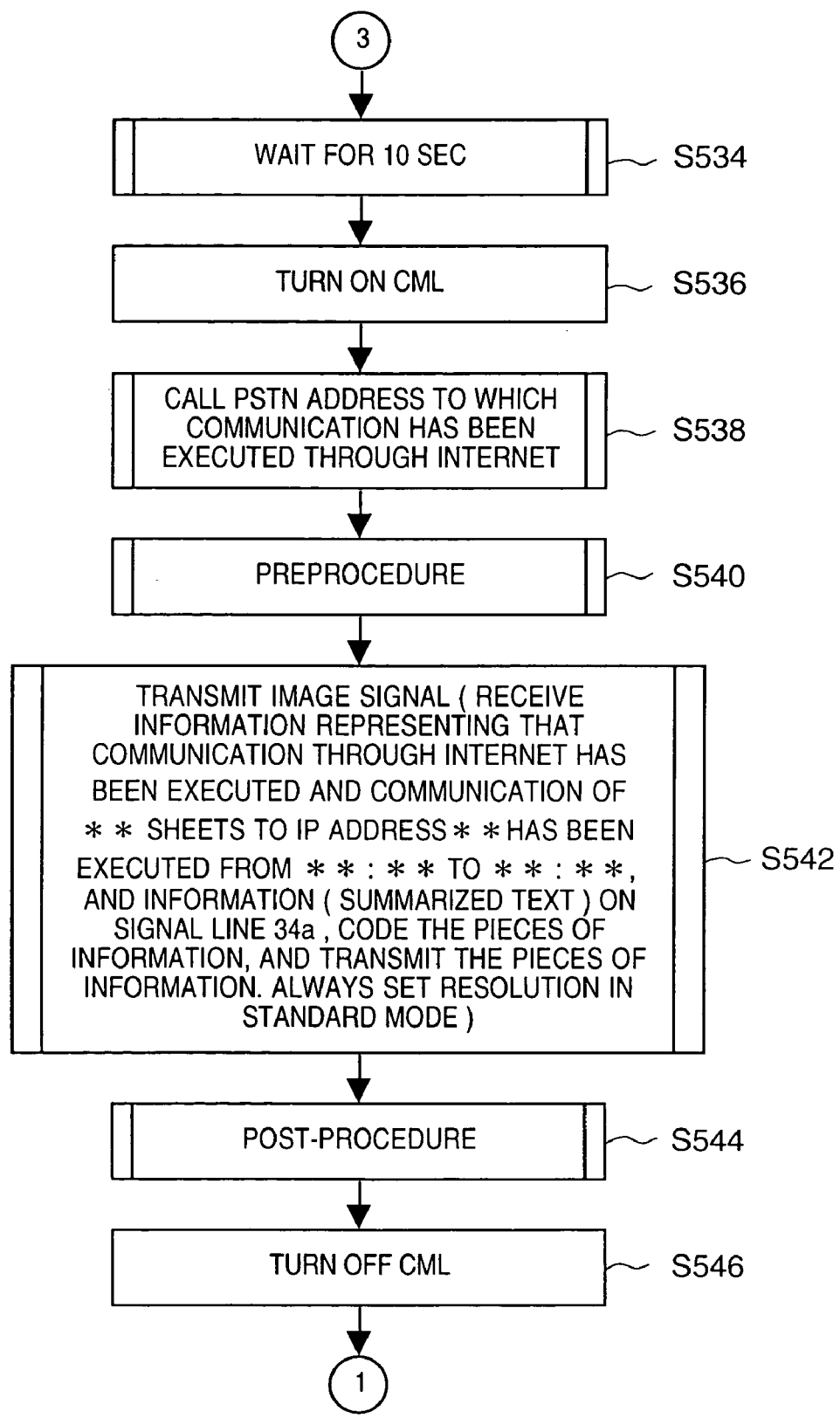
FIG. 20 is a flow chart showing the operation of the sixth embodiment.

FIGS. 18 to 20 are flow charts showing the control flow of the control circuit 220 of this embodiment.

Referring to FIG. 18, the operation is started in step S500. In step S502, a clear pulse is generated on the signal line 220f to display "transmission of first page" on the display circuit 230. In step S504, a signal of level "0" is output to the signal line 220a to turn off the CML.

In step S506, a signal of level "0" is output to the signal line 220d not to transmit the ANSam signal. In step S508, information on the signal line 232a is received to determine whether registration in the registration circuit 222. If YES in step S508, the flow advances to step S510 to register the dial-up station address in the dial-up station address registration circuit 222 through the signal line 222a, and the flow advances to step S512. If NO in step S508, the flow directly advances to step S512.

In step S512, information on the signal line 232a is received to determine whether registration in the registration circuit 224 is selected. If YES in step S512, the flow advances to step S514 to register the IP address and the PSTN address in the registration circuit 224 through the signal line 224a in correspondence with the station address (one-touch dial or abbreviated dial), and the flow advances to step S516. If NO in step S512, the flow advances to step S516.

In step S516, information on the signal line 232a is received to determine whether facsimile transmission is selected. If YES in step S516, the flow advances to step S520; otherwise, the flow advances to step S518 to perform other processing.

In step S520, a signal of level "1" is output to the signal line 220a to turn on the CML. In step S522, dial-up connection is performed to set up connection to the service provider 244. In step S524, the PPP (Point to Point Protocol) is executed, and the TCP/IP (Transport Control Protocol/Internet Protocol) is executed.

In step S526, a text summarization start pulse is generated through the signal line 220g. In step S528, the transmission information is MH-coded in a selected resolution (standard mode (main scanning: 8 pel/mm, and subscanning: 3.85 line/mm), fine mode (main scanning: 8 pel/mm, and subscanning: 7.7 line/mm), and superfine mode (main scanning: 8 pel/mm, and subscanning: 15.4 line/mm), formatted into a Tiff-f (Tag image file format-f) by MIME (Multipurpose Internet Mail Extensions), and transmitted by the SMTP (Simple Mail Transfer Protocol). Simultaneously, the number of transmitted pages and the communication time are stored.

In step S530, a summarization end pulse is generated through the signal line 220g. In step S532, a signal of level "0" is output to the signal line 220a to turn off the CML.

In step S534, processing waits for 10 sec. In step S536, a signal of level "1" is output to the signal line 220a to turn on the CML. In step S538, the address of the PSTN to which communication has been executed through the Internet is received, and the PSTN address is called.

In step S540, the preprocedure is performed. In step S542, an image signal is transmitted. Information (summarized text) on the signal line 234a and information representing that communication of  sheets to the IP address  through the Internet has been executed from  :  to  :  are received, coded, and transmitted. At this time, the resolution is set in the standard mode (main scanning: 8 pel/mm, and subscanning: 3.85 line/mm) independently of the resolution of communication through the Internet.

In step S544, the post-procedure is executed. In step S546, a signal of level "0" is output to the signal line 220a to turn off the CML. The flow returns to step S504.

Seventh Embodiment

The seventh embodiment of the present invention will be described next.

In the seventh embodiment, as description information to be transmitted using the PSTN, information of the first page of facsimile information transmitted through the Internet is transmitted in place of the summarized text in the above-described sixth embodiment.

Figure 21:
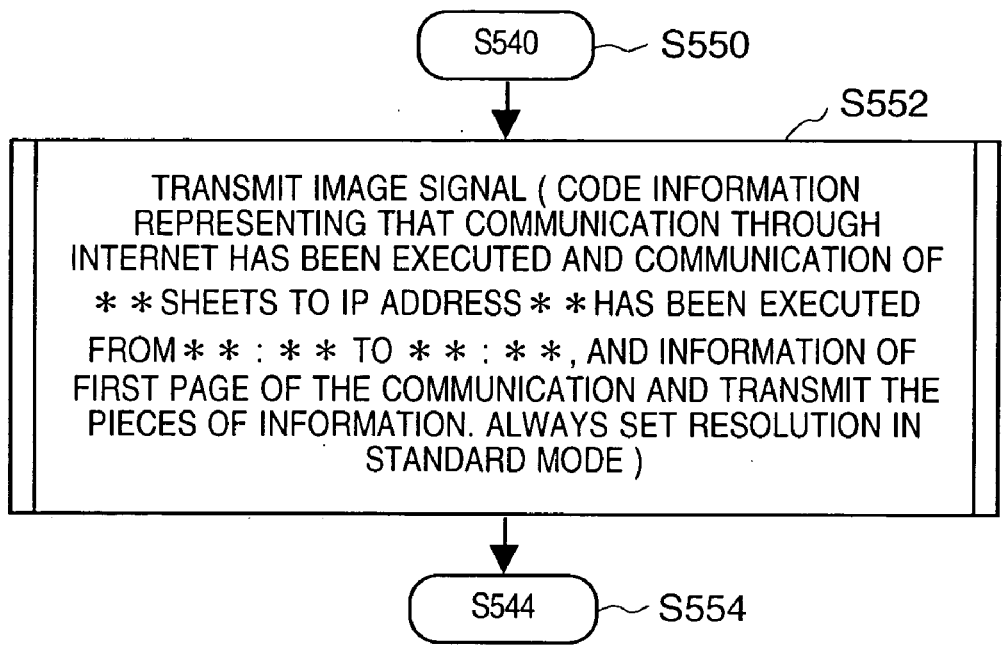
FIG. 21 is a flow chart showing the operation of the seventh embodiment.

FIG. 21 is a flow chart showing the operation of the control unit of the seventh embodiment except the same part as in the above-described sixth embodiment (FIGS. 18 to 20).

In FIG. 21, step S550 correspond to step S540. In step S552, an image signal is transmitted. Information of the first page of the communication and information representing that communication of  sheets to the IP address  through the Internet has been executed from  :  to  :  are coded and transmitted. At this time, the resolution is set in the standard mode (main scanning: 8 pel/mm, and subscanning: 15.4 line/mm) independently of the resolution of communication through the Internet. Step S554 corresponds to step S544.

Eighth Embodiment

In the eighth embodiment, as description information to be transmitted using the PSTN, a summary of facsimile communication or information of the first page of facsimile information transmitted through the Internet is selected.

Figure 22:
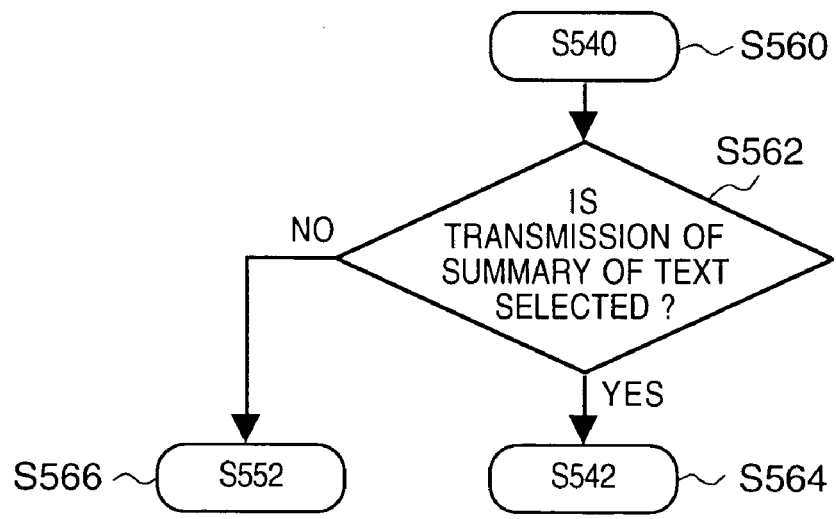
FIG. 22 is a flow chart showing the operation of the eighth embodiment.

FIG. 22 is a flow chart showing the operation of the control unit of the eighth embodiment except the same part as in the above-described sixth embodiment (FIGS. 18 to 20).

In FIG. 22, step S560 corresponds to step S540. In step S562, information on the signal line 230a is received to determine whether transmission of the summary of the text is selected. If YES in step S562, the flow advances to step S564 (S542). If the first page of facsimile information is selected, the flow advances to step S566 (S552).

Ninth Embodiment

The ninth embodiment of the present invention will be described next.

In the ninth embodiment, when the number of pages of an original to be transmitted from a station A to a station B through the Internet is equal to or smaller than a predetermined value, neither communication through the Internet nor transmission of description information through the PSTN is performed, and all pieces of information are transmitted from the station A to the station B through the PSTN.

Figure 23:
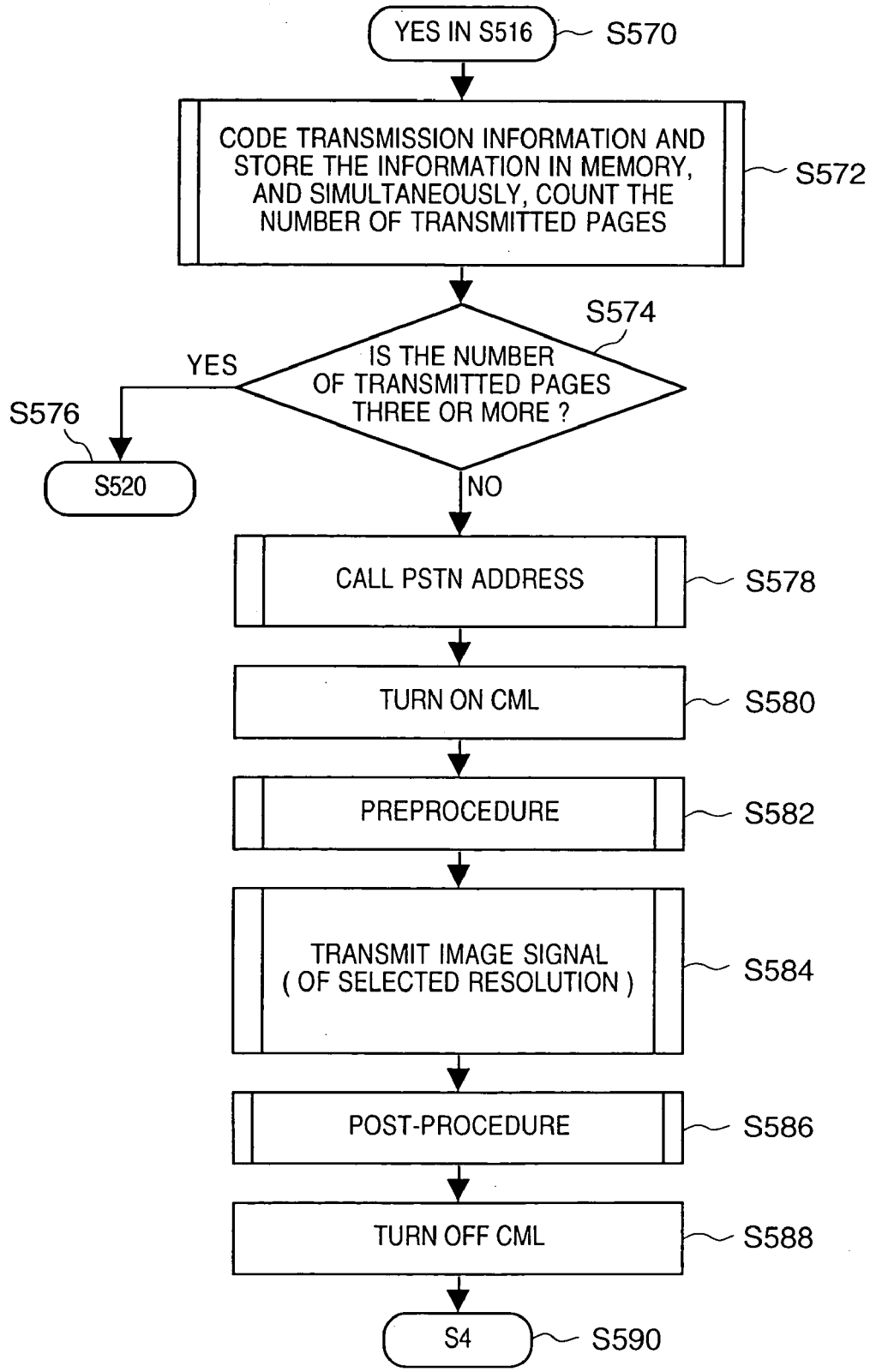
FIG. 23 is a flow chart showing the operation of the ninth embodiment.

FIG. 23 is a flow chart showing the operation of the control unit of the ninth embodiment except the same part as in the above-described sixth embodiment (FIGS. 18 to 20).

In FIG. 23, step S570 corresponds to YES in step S516. In step S572, the transmission information is coded and stored in the memory, and simultaneously, the number of transmitted pages is counted.

In step S574, it is determined whether the number of transmitted pages is three or more. If YES in step S574, the flow advances to step S576 (S520); otherwise, the flow advances to step S578.

In step S578, the PSTN address is called. In step S580, a signal of level "1" is output to the signal line 220a to turn on the CML.

In step S582, the preprocedure is executed. In step S584, an image signal is transmitted. The resolution is selected from the standard mode, the fine mode, and the superfine mode. In step S586, the post-procedure is performed. In step S588, a signal of level "0" is output to the signal line 220a to turn off the CML The subsequent step S590 corresponds to step S504.

The above-described operation of the control circuit is performed by the CPU in the control circuit on the basis of a program stored in the ROM or RAM in the control circuit. In the present invention, such a program may be stored in an external storage medium such as a floppy disk, a hard disk, an optical disk, a magneto-optical disk, a CD-ROM, or a memory card, loaded in the control circuit by a dedicated read unit, and executed by the CPU in the control circuit.

In the above embodiments, a facsimile apparatus of stand-alone type has been exemplified. However, the present invention is not limited to this. The present invention can be applied to data communication control in a general data processing system wherein, e.g., a copy function, an electronic file function, and a data processing function are combined with the communication function. The present invention can also be applied to a communication apparatus separated from the read circuit or the recording circuit.

As described above according to the sixth to ninth embodiments of the present invention. The operator at the station B first recognizes that facsimile communication through the Internet has been executed, on the basis of the description information transmitted through the general public network. After this, the apparatus can be connected to the ISP by dial-up connection, as needed, to receive the whole text of facsimile information. In addition, access to the ISP can be stopped, as needed, so a very convenient system can be provided.

According to the sixth embodiment of the present invention, the operator at the station B can effectively recognize the contents of facsimile information through the Internet with reference to summarized text which briefly represents the contents of the facsimile communication. As a result of recognition, the apparatus can be connected to the ISP by dial-up connection, as needed, to receive the whole text of facsimile information. In addition, access to the ISP can be stopped, as needed, so a very convenient system can be provided.

According to the seventh embodiment of the present invention, the operator at the station B can effectively recognize the contents of facsimile information through the Internet with reference to the information of the first page of facsimile information. As a result of recognition, the apparatus can be connected to the ISP by dial-up connection, as needed, to receive the whole text of the facsimile information. In addition, access to the ISP can be stopped, as needed, so a very convenient system can be provided.

According to the sixth to ninth embodiments of the present invention, the operator at the station B can determine whether facsimile communication information has arrived at the ISP near the self apparatus, on the basis of the communication time and the current time. The operator can also know the number of pages transmitted by communication through the Internet, so a very convenient system can be provided.

According to the seventh embodiment of the present invention, the contents of description information can be selected in accordance with the condition of the transmitter, so a very convenient system can be provided.

According to the ninth embodiment of the present invention, if it is determined, on the basis of information to be transmitted to the station B, that transmission of summarized text or the first page of facsimile information through the PSTN increases the communication cost or is not effective, communication through the Internet is not performed, and instead, communication through the PSTN can be performed, so a very convenient system can be provided.

As many apparently widely different embodiments of the present invention can be made without departing from the spirit and scope thereof, it is to be understood that the invention is not limited to the specific embodiments thereof except as defined in the appended claims.

The invention claimed is:

1. A communication apparatus capable of facsimile communication through the Internet by dial-up connection, comprising:
    an Internet communication execution unit configured to establish a dial-up connection from a station A to an Internet service provider to execute a facsimile communication with a station B having a TCP/IP address through the Internet;
    a notification unit configured to notify the station B via the PSTN of report information representing that a facsimile has been sent to the station B through the Internet and description information of the facsimile, when the facsimile communication has been executed by said Internet communication execution unit; and
    a control unit configured to cause said notification unit not to perform notification operation, when the number of pages of the facsimile information to be transmitted from the station A to the station B through the Internet is not more than a predetermined value.

2. The apparatus according to claim 1, wherein the description information is summarized text representing a summary of facsimile communication.

3. The apparatus according to claim 1, wherein the description information is information of a first page of facsimile information transmitted through the Internet.

4. The apparatus according to claim 1, wherein
    said notification means further transmits a number of pages of facsimile information transmitted through the Internet and a communication time.

5. The apparatus according to claim 1, further comprising:
    selection means for selecting, as the description information to be transmitted, either summarized text representing a summary of facsimile communication or information of a first page of facsimile information transmitted through the Internet.

6. The apparatus according to claim 1, wherein said control unit transmits the facsimile information from the station A to the station B through a general public network without performing communication by said Internet communication execution unit and notification operation by said notification unit, when the number of pages of the facsimile information to be transmitted from the station A to the station B through the Internet is not more than predetermined value.

7. A control method for a communication apparatus capable of facsimile communication through the Internet by dial-up connection, comprising:
    establishing a dial-up connection from a station A to an Internet service provider to execute a facsimile communication with a station B having a TCP/IP address through the Internet;
    calling the station B from the station A, when the dial-up connection is established, notifying the station B via the PSTN of report information representing that a facsimile has been sent to the station B through the Internet and description information of the facsimile, when the facsimile communication has been executed by an Internet communication execution unit; and
    controlling a notification unit not to perform notification operation, when a number of pages of facsimile information to be transmitted from the station A to the station B through the Internet is not more than a predetermined value.

8. The control method according to claim 7, wherein a control unit transmits the facsimile information from the station A to the station B through a general public network without performing communication by said Internet communication execution unit and notification operation by said notification unit, when the number of pages of the facsimile information to be transmitted from the station A to the station B through the Internet is not more than predetermined value.

9. A computer-readable storage medium which stores a program for controlling a communication apparatus capable of facsimile communication through the Internet by dial-up connection, comprising:
    a procedure code for establishing a dial-up connection from a station A to an Internet service provider to execute a facsimile communication with a station B having a TCP/IP address through the Internet;
    a procedure code for calling the station B from the station A, when the dial-up connection is established, notifying the station B via the PSTN of report information representing that a facsimile has been sent to the station B through the Internet and description information of the facsimile, when the facsimile communication has been executed by an Internet communication execution unit; and
    a procedure code for controlling a notification unit not to perform notification operation, when a number of pages of facsimile information to be transmitted from the station A to the station B through the Internet is not more than a predetermined value.

10. The computer readable storage medium according to claim 9, wherein a control unit transmits the facsimile information from the station A to the station B through a general public network without performing communication by said Internet communication execution unit and notification operation by said notification unit, when the number of pages of the facsimile information to be transmitted from the station A to the station B through the Internet is not more than predetermined value.

11. A communication apparatus comprising:
an Internet communication execution unit for transmitting facsimile data via the Internet;
a notification unit configured to notify a recipient, via the PSTN of report information representing that a facsimile has been sent to the recipient through the Internet and description information of the facsimile, when the facsimile communication has been executed by said Internet communication execution unit; and
a control unit configured to cause said notification unit not to perform notification operation, when the number of pages of the facsimile data to be transmitted by said transmission means through the Internet is not more than a predetermined value.

12. The apparatus according to claim 11, wherein said control unit transmits the facsimile information through a general public network without performing communication by said Internet communication execution unit and notification operation by said notification unit, when the number of pages of the facsimile information to be transmitted from said communication apparatus to the recipient through the Internet is not more than predetermined value.

* * * * *